Oct. 25, 1932. J. J. N. VAN HAMERSVELD 1,884,985

HYDRAULIC OPERATING SYSTEM FOR MACHINE TOOLS

Filed Nov. 8, 1930 11 Sheets-Sheet 1

Oct. 25, 1932.  J. J. N. VAN HAMERSVELD  1,884,985
HYDRAULIC OPERATING SYSTEM FOR MACHINE TOOLS
Filed Nov. 8, 1930  11 Sheets-Sheet 3
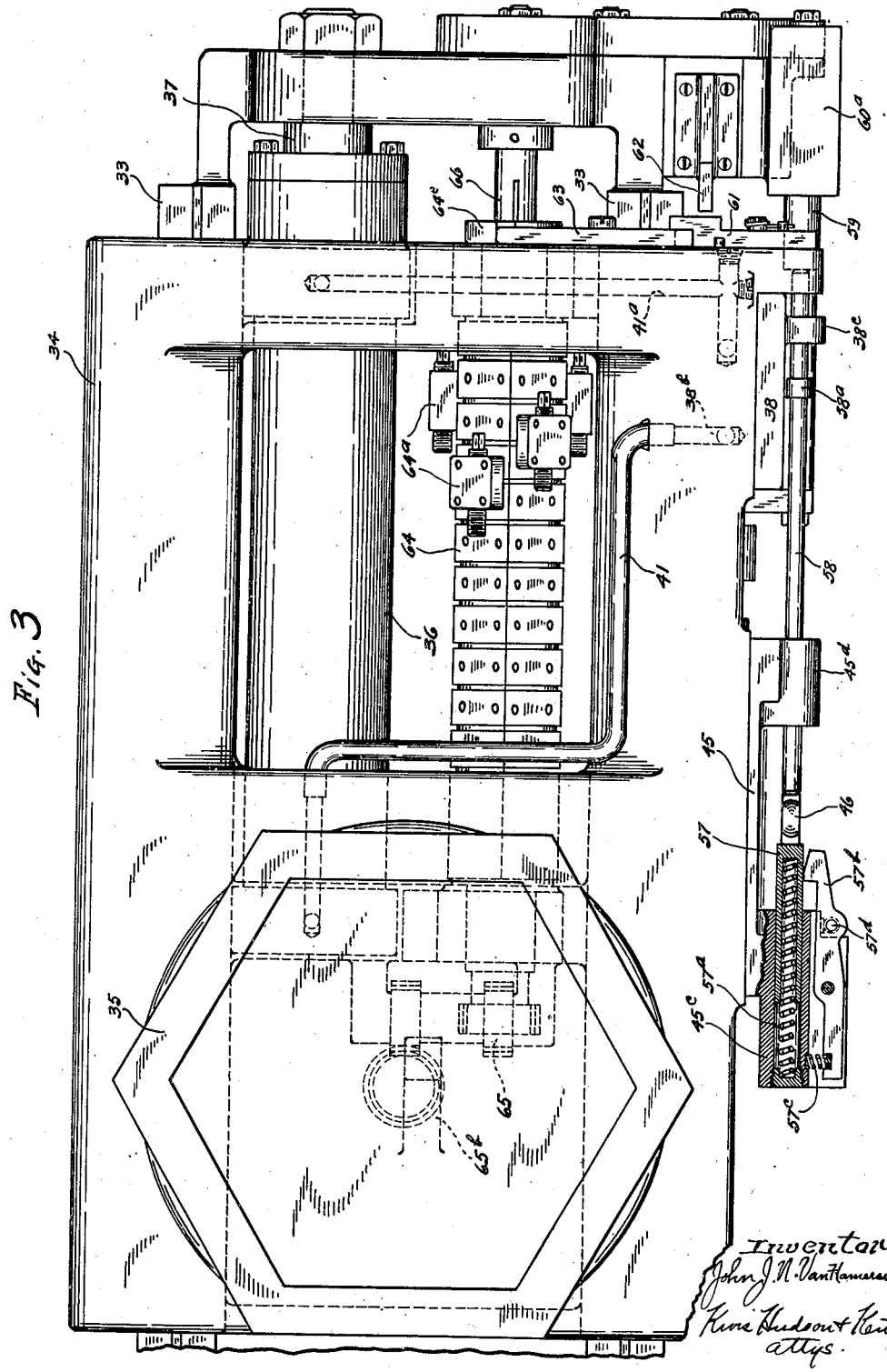

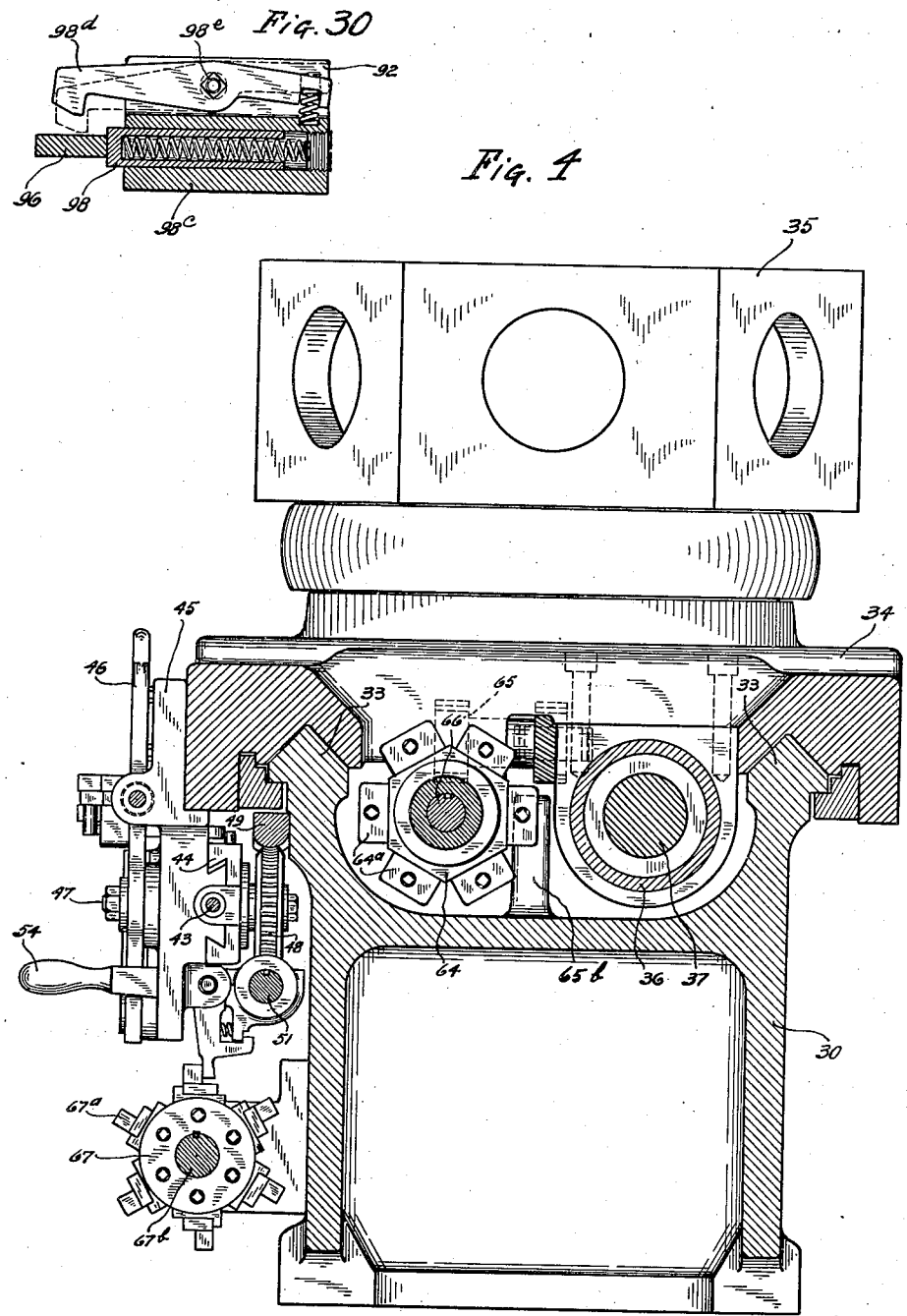

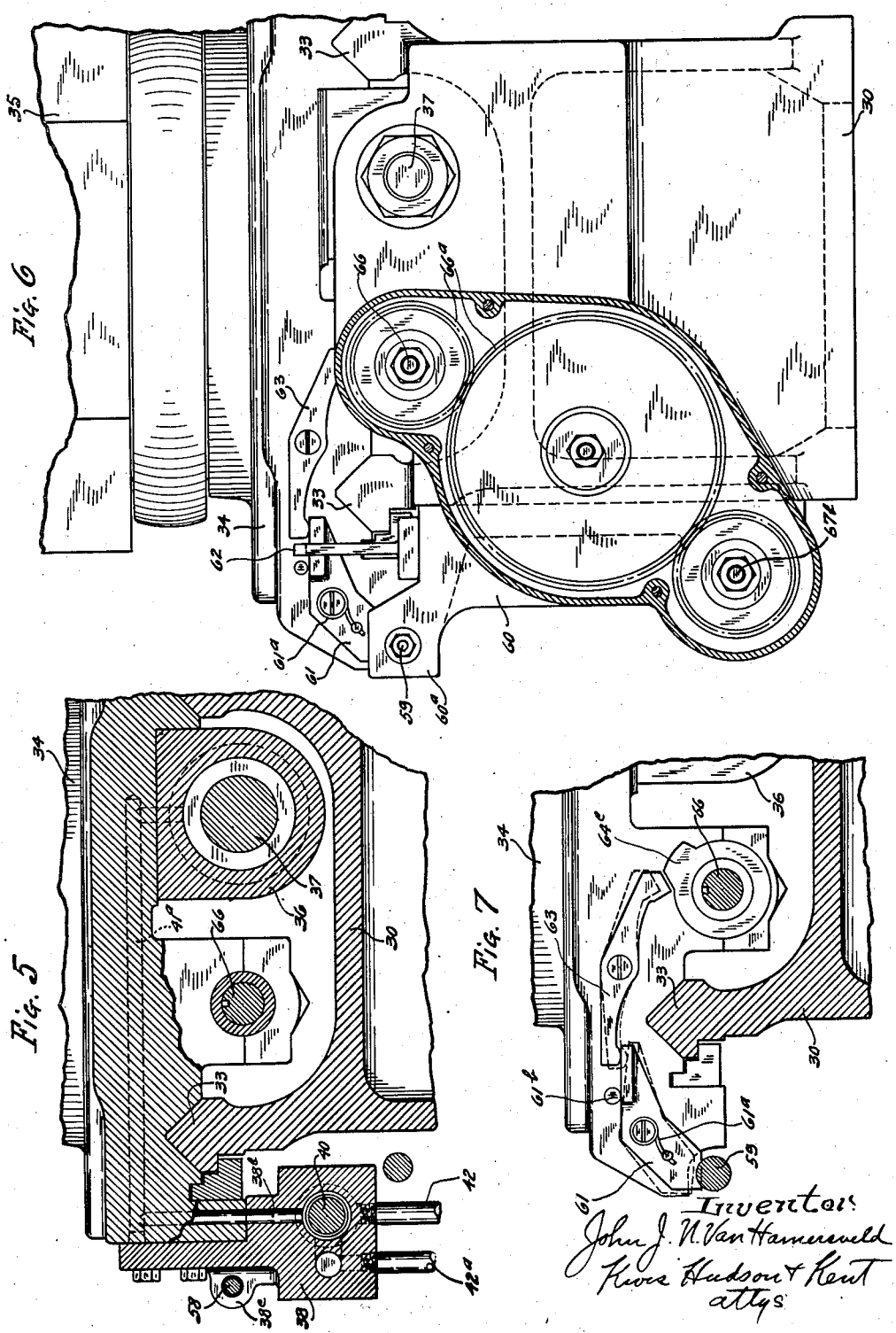

Oct. 25, 1932.   J. J. N. VAN HAMERSVELD   1,884,985
HYDRAULIC OPERATING SYSTEM FOR MACHINE TOOLS
Filed Nov. 8, 1930   11 Sheets-Sheet 6
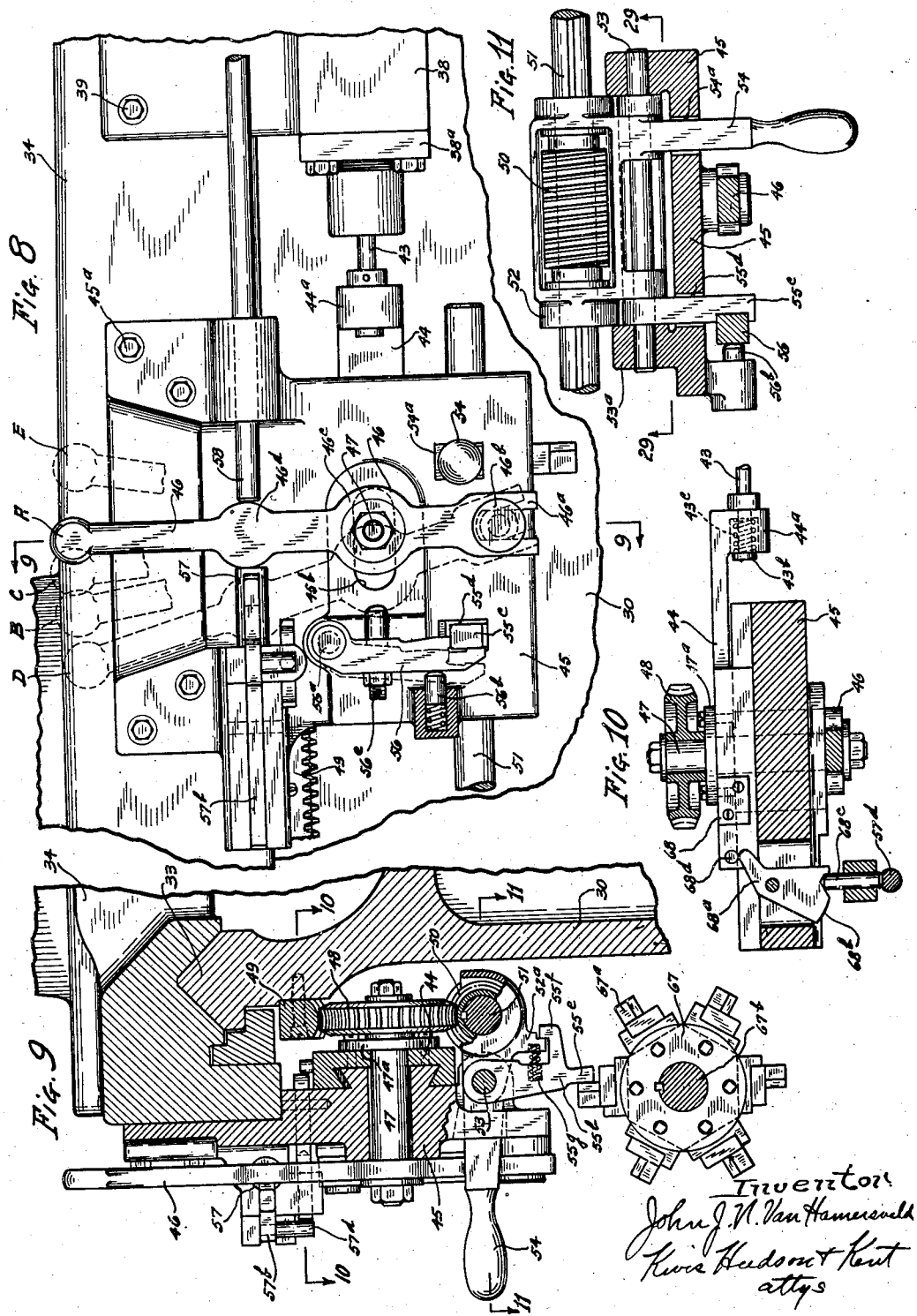

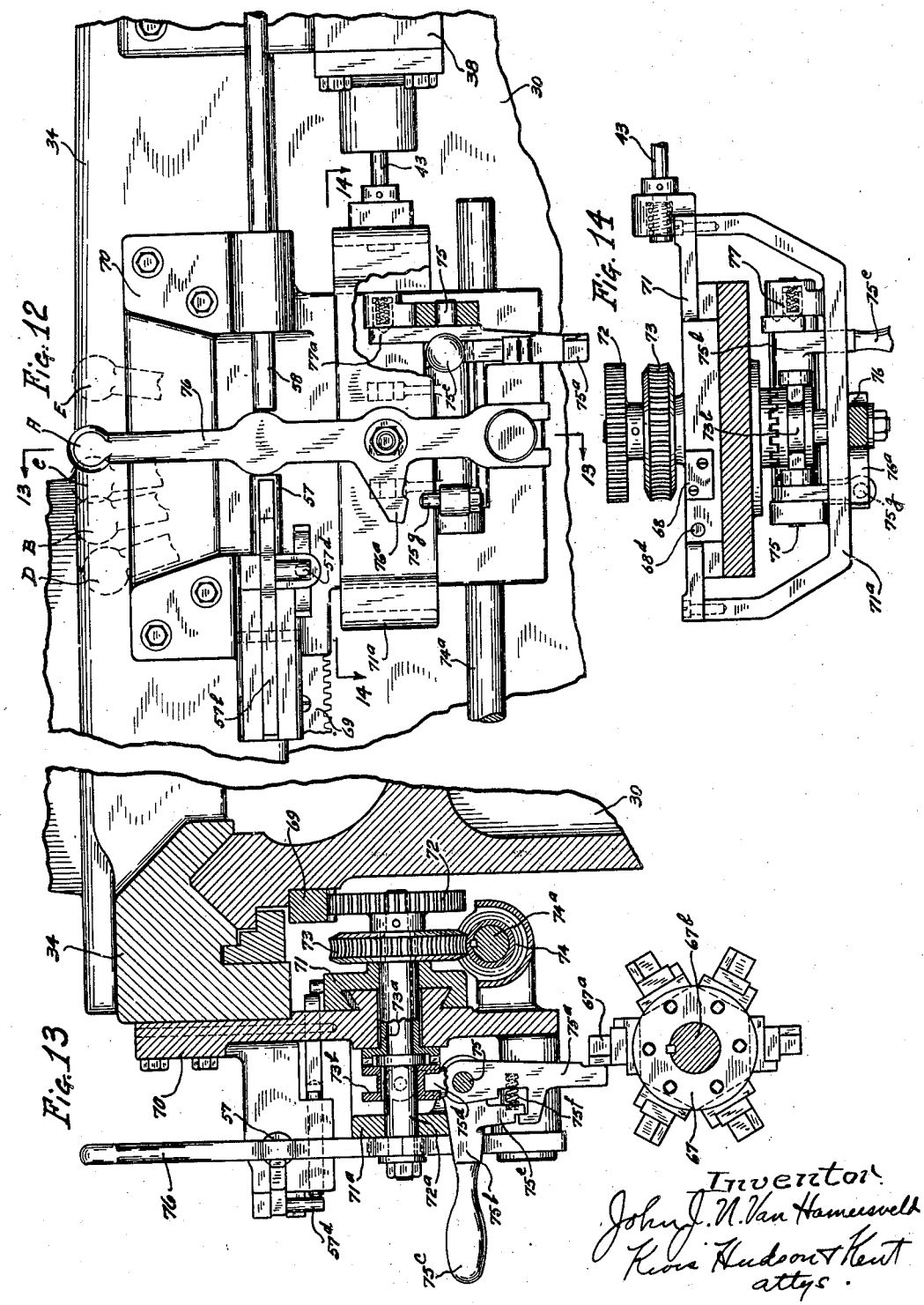

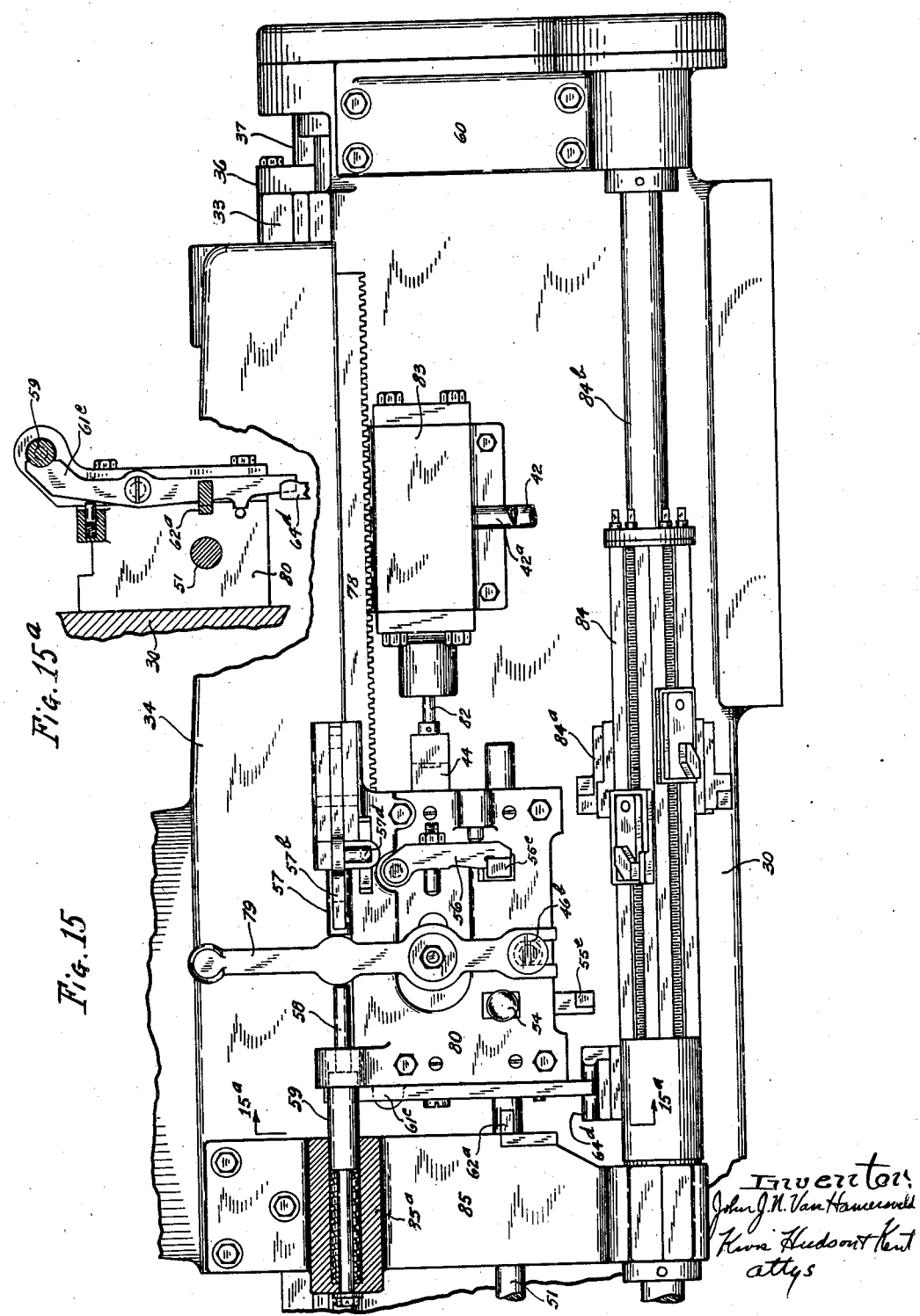

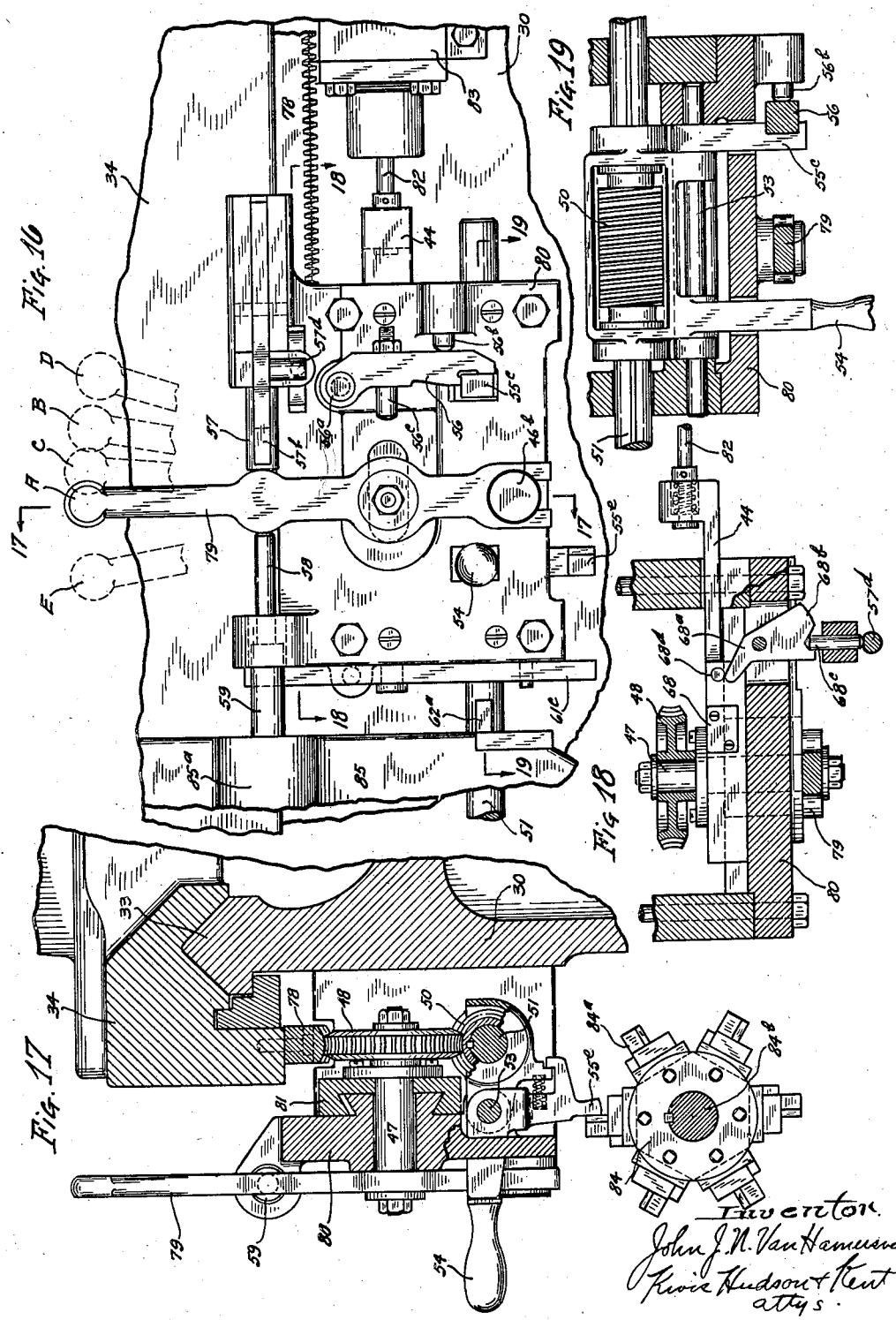

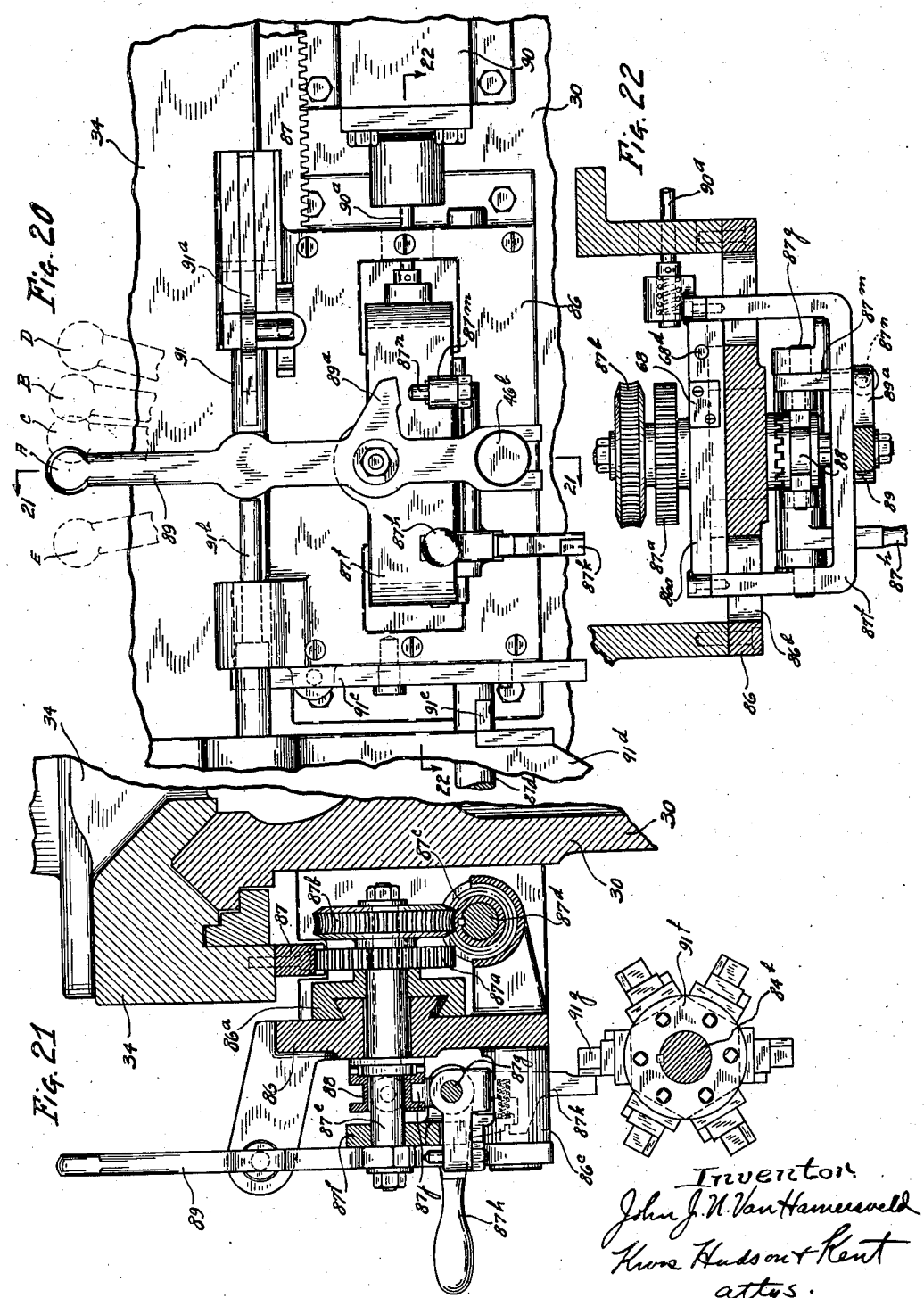

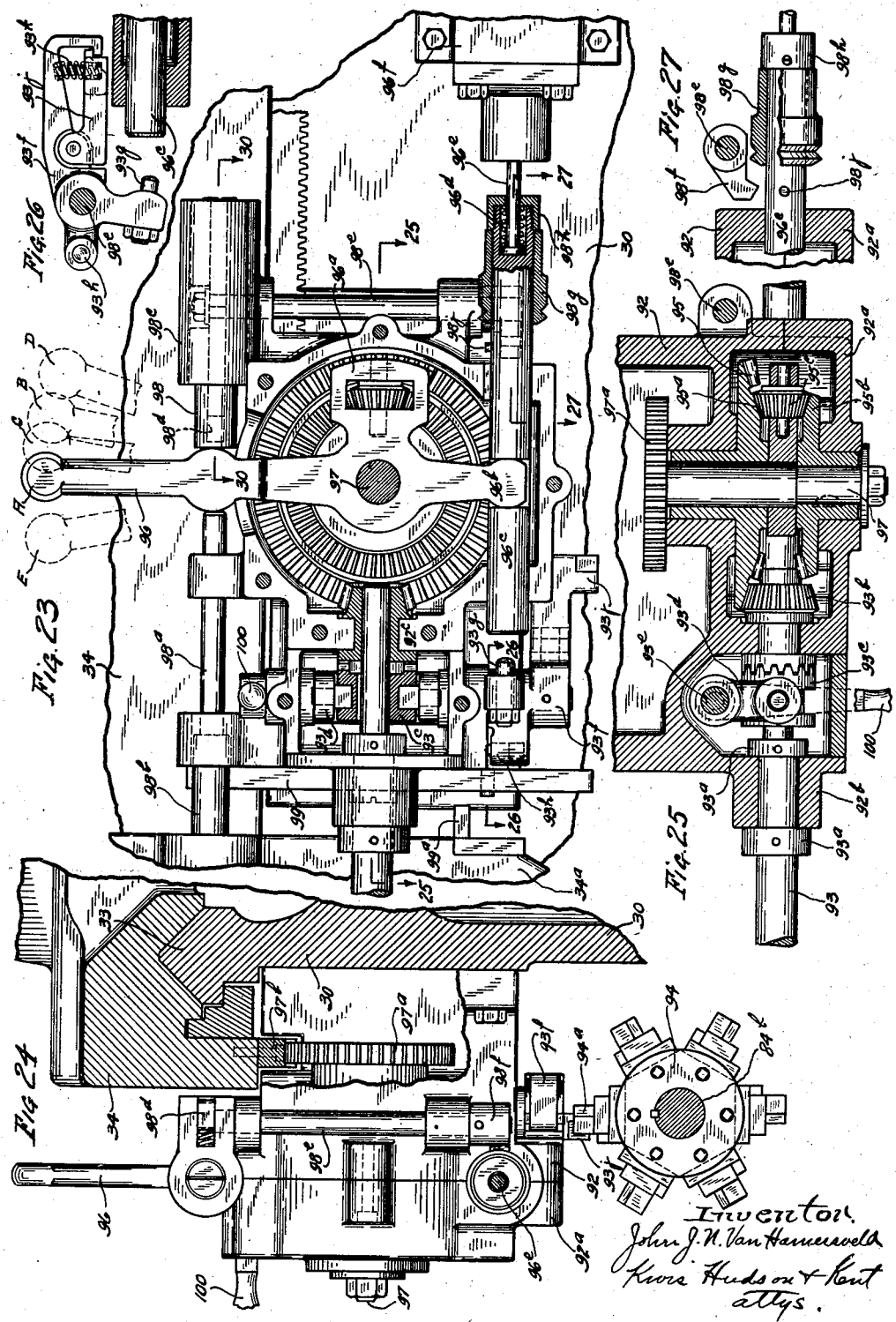

Patented Oct. 25, 1932

1,884,985

UNITED STATES PATENT OFFICE

JOHN J. N. VAN HAMERSVELD, OF CLEVELAND HEIGHTS, OHIO, ASSIGNOR TO THE WARNER & SWASEY COMPANY, OF CLEVELAND, OHIO, A CORPORATION OF OHIO

HYDRAULIC OPERATING SYSTEM FOR MACHINE TOOLS

Application filed November 8, 1930. Serial No. 494,319.

This invention relates to a control system for machine tools. More particularly, it relates to a control means for a hydraulic operating system for machine tools having a movable member whose rate of movement is to be accurately controlled at least for a portion of its complete cycle of movement.

The invention finds particular utility in connection with machine tools, such as lathes, wherein the movable member is a tool or work holding slide which is movable in opposite directions along the ways of the bed, a member of this kind being usually given a rapid forward movement, then a relatively slow feeding movement, and then a rapid return movement.

The principal object of the present invention is to provide an improved hydraulic actuating system for the movable member of a machine tool whose movement is to be controlled, together with means for insuring a constant movement during the feed or relatively slow movement when the cutting operation takes place, regardless of the variable leakage factor in the hydraulic system, or other factors which might tend to cause an irregular movement.

Further objects are to provide, in association with the control means referred to above, means for providing full automatic operation including the automatic changes in speed or rate of movement and the reversal of movement with a predetermined but variable dwell period between the end of the feeding movement and the rapid reverse or return movement, and suitable provision for allowing the hydraulically actuated member to make a predetermined number of complete cycles of movement and to be then stopped to permit the machine to be unloaded and loaded.

A further object is to provide an improved mechanism for insuring a constant feeding movement, this mechanism being in the form of a differential and operating on the differential principle.

The above and other objects are attained by the present invention which may be here briefly summarized as consisting in certain novel combinations and arrangements of parts and details of construction which will be described in the specification and set forth in the appended claims.

In the accompanying sheets of drawings, I have shown several embodiments of the invention applied to a turret lathe, but while my invention is particularly useful in connection with a machine tool of this type, the turret lathe is an example only of different machine tools to which the invention in whole or in part may be applied to advantage. It will be understood therefore that in thus illustrating the invention I am not to be confined to a machine tool of this kind nor to a machine tool wherein the hydraulically actuated member whose rate of movement is to be controlled is in the form of a tool holding slide.

In the drawings,

Fig. 3 is a top plan view of that portion of the lathe shown in Fig. 2;

Fig. 4 is a transverse sectional view substantially along the line 4—4 of Fig. 2;

Fig. 5 is a transverse sectional view substantially along the irregular line 5—5 of Fig. 2;

Fig. 6 is a rear end view, looking toward the left of Fig. 2, with the cover for certain gears removed;

Fig. 7 is a fragmentary transverse sectional view substantially along the line 7—7 of Fig. 2;

Fig. 8 is a view showing a portion of Fig. 2 on a comparatively enlarged scale illustrating by full and dotted lines different positions of the main control lever and some other parts;

Fig. 9 is a fragmentary transverse sectional view substantially along the line 9—9 of Fig. 8;

Fig. 10 is a detail or fragmentary sectional view substantially along the line 10—10 of Fig. 9;

Fig. 11 is another fragmentary or detail sectional view along the line 11—11 of Fig. 9;

Figs. 12, 13 and 14 are views corresponding to Figs. 8, 9 and 10, but showing a modification;

Fig. 15 is a view similar to Fig. 2, showing a still further modification;

Fig. 15ª is a detail sectional view substantially along the line 15ª—15ª of Fig. 15;

Figs. 16, 17, 18 and 19 are detail views of the modification shown in Fig. 15; Fig. 16 being a view corresponding to Fig. 8, and Figs. 17, 18, and 19 being sectional views along the lines 17—17, 18—18 and 19—19 respectively of Fig. 16;

Figs. 20, 21 and 22 illustrate a still further modification, these three views corresponding respectively to Figs. 16, 17 and 18;

Figs. 23 to 27 illustrate a still further modification, Figs. 23, 24 and 25 corresponding to Figs. 20, 21 and 22, and Figs. 25, 26 and 27 being detail or fragmentary sectional views substantially along the lines 25—25, 26—26 and 27—27 of Fig. 23;

Fig. 28 is a detail sectional view similar to Fig. 10 but with the parts shown therein differently positioned;

Fig. 29 is a detail sectional view substantially along the line 29—29 of Fig. 11; and Fig. 30 is a detail sectional view substantially along the line 30—30 of Fig. 23.

Figure 1:
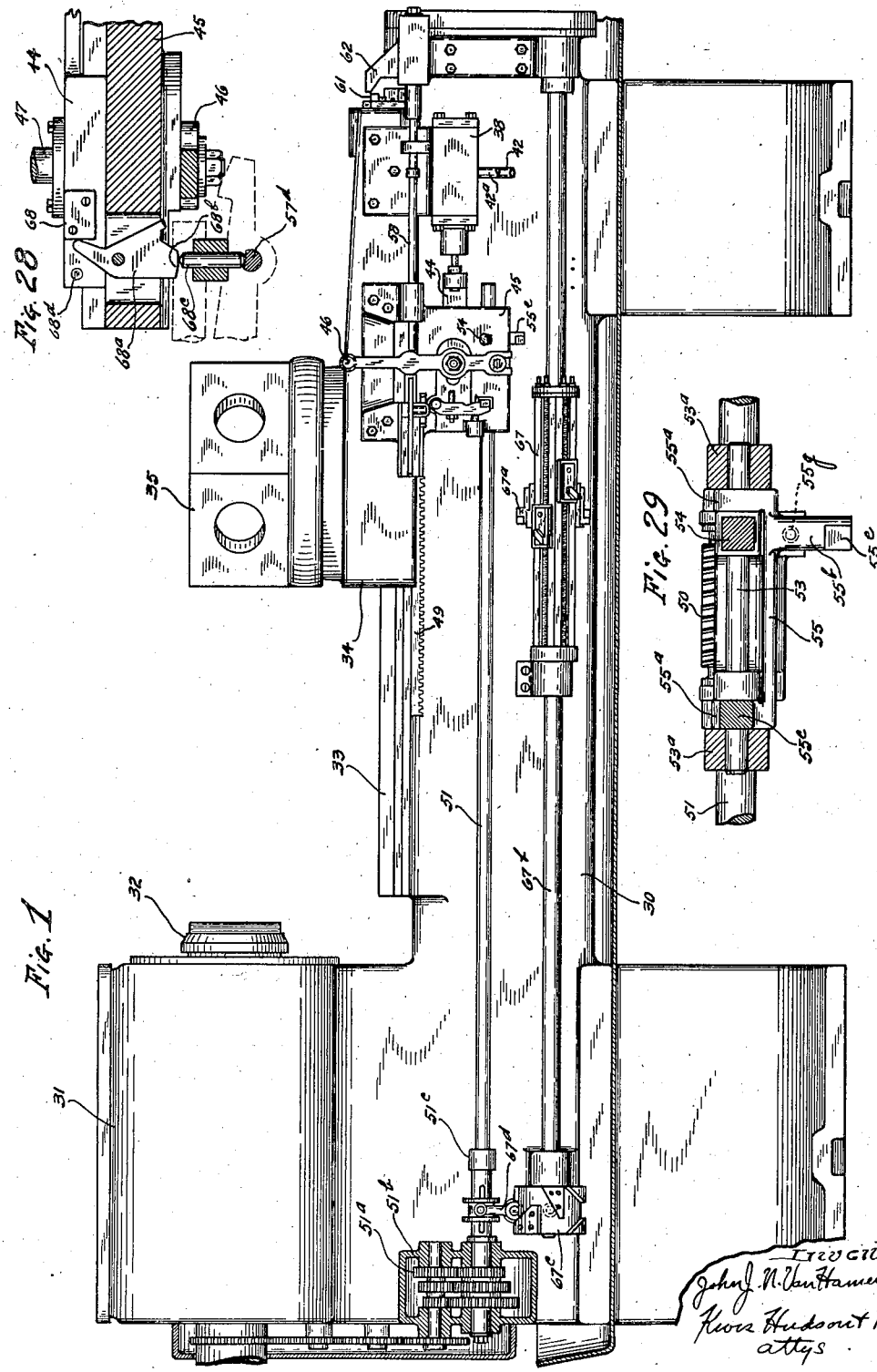
Figure 1 is a side view of a lathe to which has been applied my invention in one of its forms.

Referring now to the drawings, and first to Fig. 1, the lathe herein illustrated has a bed 30, a head 31 having a work spindle 32 which may be rotated by the usual gearing in the head with any suitable source of power, such as an electric motor, belt or common means utilized in machines of this kind. The bed has ways 33 for a turret slide 34 constituting in this instance the movable member which is moved forwardly and rearwardly along the ways 33 of the bed by hydraulically actuated means and the movement of which is controlled by the parts or means constituting the present invention. The turret slide has a turret 35 which in this instance is a tool holding turret having a number of faces, here six in number, for supporting the tools to operate on a work piece carried by a chuck or other suitable means supported by the rotary spindle 32.

The hydraulic actuating means for the slide 34 includes a motor in the form of a cylinder and piston. Either element of the motor may be attached to the slide, but in this instance the cylinder 36 is attached to the slide (see Figs. 3 and 4) and the piston and piston rod, designated by the reference character 37, are stationary, the rear end of the piston and rod (for convenience termed the piston) being shown in Fig. 3 as secured to the rear portion of the bed.

As is usually the case in hydraulic systems of this kind, the motive fluid is a suitable liquid, such as a special oil, supplied under pressure by means of a pump which in itself is not illustrated as any suitable pump which supplies the motive fluid at the desired constant pressure may be employed, along with the customary relief or bleeding valve to relieve the pressure when the predetermined pressure is reached or exceeded, as for example when the slide comes to a stop at the end of the feeding movement or when the control valve is in neutral position. The hydraulic system includes also a control valve which is between the pump and the motor and a control lever which may be manually operated to start the operation of the slide or otherwise when the manual control is desired, as when making trial cuts, and at other times is operated automatically, as will be hereinafter described.

The valve and the control lever may be mounted on the slide or they may be mounted on the bed, i. e., may be stationarily mounted in so far as the forward and rearward movements of the slide are concerned. Both arrangements are herein illustrated, but in the form illustrated in Figs. 1 to 11, they are mounted on the slide. In these figures, the valve chamber is shown at 38, this chamber having an extension which is secured by bolts 39 to the front part of the slide near the rear end thereof (see Figs. 2 and 8). The valve chamber 38 has a cylindrical bore in which is slidable in an endwise and horizontal direction a movable valve member 40 having two enlarged end portions and a skeleton-shaped reduced middle portion. The ends of the chamber are closed by plates 38ª one having a suitable stuffing box for the valve stem. The enlarged end portions of the movable valve member are adapted to cover and uncover the ports 38ᵇ of the valve chamber 38 which ports are connected by passageways 41 and 41ª, which may be piping or openings drilled in the slide, to opposite ends of the motor cylinder 36. The passageway 41 which extends to the front part of the cylinder is adapted to supply motive fluid to move the slide forwardly, and the passageway which leads to the rear part of the cylinder is adapted to supply the motive fluid for moving the slide rearwardly. Obviously, when one of these passageways supplies the motive fluid to the cylinder, the other passageway conducts it back to the valve chamber. Leading to the lower part of the valve chamber are supply and exhaust passageways 42 and 42ª which in this instance are flexible pipes or conduits connecting the valve chamber to the pump, the pipe 42 being the supply pipe and the pipe 42ª being the exhaust pipe or pipe for returning the motive fluid to the pump.

Figure 2:
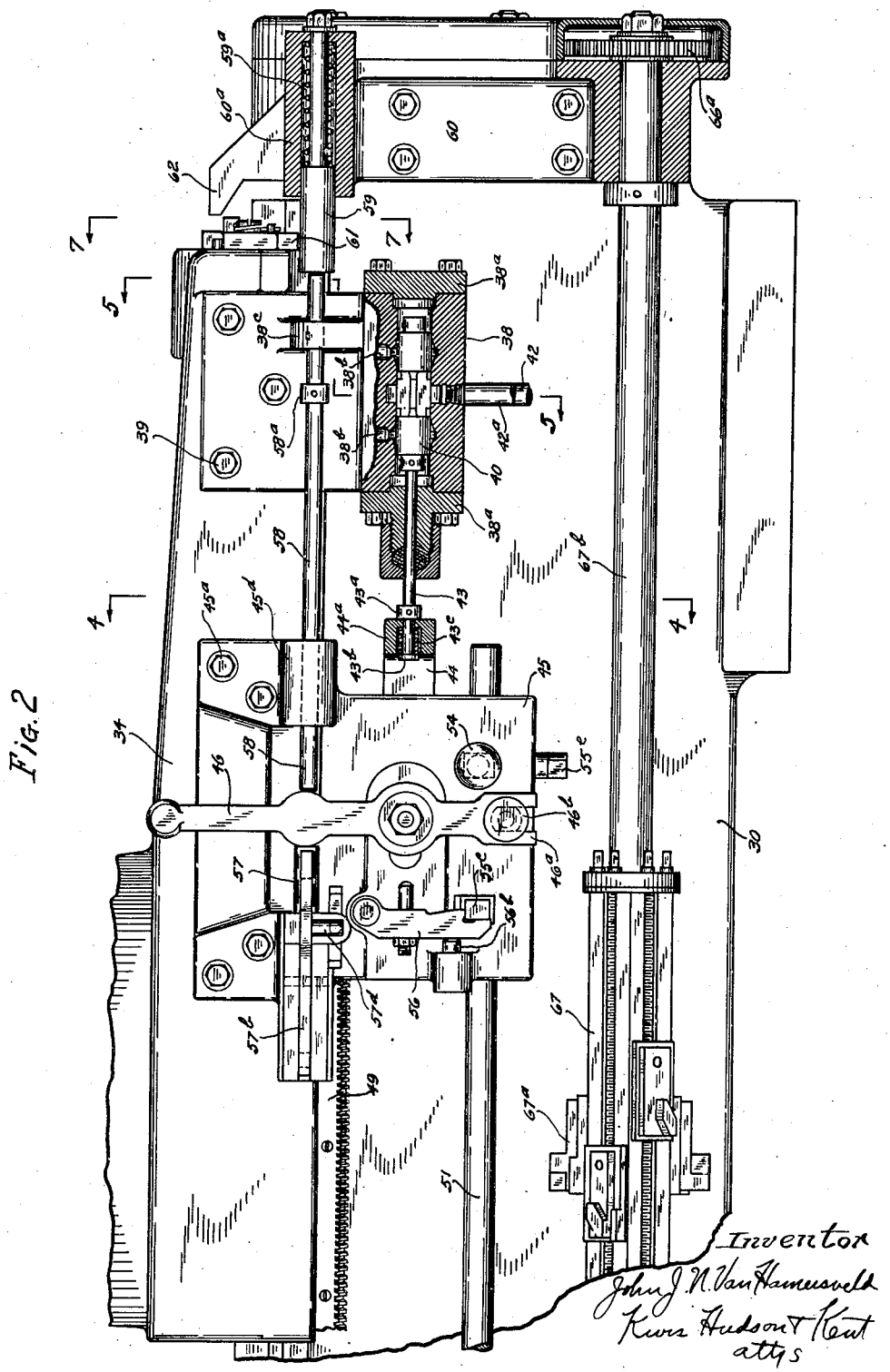
Fig. 2 is an enlarged side elevation of the rear portion of Fig. 1 with the parts arranged as in Fig. 1 and with certain parts in section.

Connected to the valve and extending through the stuffing box of one of the end plates 38ª of the valve chamber is a valve rod or stem 43 which is connected to a control slide or actuator 44 which is slidingly mounted on and has a dovetail connection with the rear side of a bracket 45 secured to the front side of the slide by bolts 45ᵃ forwardly of the valve chamber, see particularly Figs. 2 and 9. The connection between the valve rod and the control slide 44 is not a fixed connection, but there are provided on the rod a pair of spaced abutments 43ᵃ and 43ᵇ, the former being adapted to abut against a shouldered portion 44ᵃ of the control slide, as illustrated in Fig 2, and the latter (abutment 43ᵇ) being separated from this shoulder portion of the control slide by a spring 43ᶜ. The function of this spring will be explained presently.

Pivotally mounted on the front of the bracket 45 is a control lever 46, the latter having a forked lower end 46ᵃ which engages a shouldered pivot pin 46ᵇ on the lower front side of the bracket 45. A short distance above the lower end of the control lever 46 is an enlargement 46ᶜ and this enlarged portion of the lever is fitted onto the reduced forward end of a shouldered stud 47 (see particularly Figs. 8 and 9), said stud having near its rear or inner end a flange 47ᵃ which is bolted to the rear side of the control slide 44 so that this stud will move therewith. The bracket 45 has an elongated slot 45ᵇ (see Figs. 2 and 8) along which the stud may move so as to permit movement of the control slide 44 with respect to the bracket 45. At the rear end of the stud 47 is rotatably mounted a worm wheel 48 which is directly beneath and at all times engages the teeth of the rack 49 which is secured to the front side of the bed (see Fig. 9), this rack having a length equal to or slightly greater than the length of travel of the slide 34 on the ways 33 of the bed. Also carried by the bracket 45 beneath the worm wheel 48 is a worm 50 which at times engages the worm wheel 48 and at other times is disengaged therefrom, the worm and worm wheel being in engagement when the relatively slow or feeding movement of the slide 34 is taking place. This worm 50 is slidable on but keyed to a shaft 51 which extends along the front side of the bed and is at all times rotated at a predetermined speed with reference to the rotation of the work spindle 32. In Fig. 1 this shaft 51 is shown geared to the spindle 32 by gearing including change speed gearing 51ᵃ in a gear box 51ᵇ secured to the bed beneath the head 31. It is not necessary to rotate the shaft 51 at different speeds relative to the work spindle 32, but in some instances that may be desirable and for that reason the multi-speed gearing 51ᵃ is provided. The change in the ratio of the gearing of shaft 51 and spindle 32 may be effected manually, or it may be effected automatically, the automatic change being shown in Fig. 1 and will be referred to presently.

Referring again to the worm 50, this worm is supported in a worm bracket 52, note particularly Figs. 9 and 11, the ends of this bracket forming bearings for the shaft 51.

The inner portion of this worm bracket 52 may be shaped so as to hold a lubricant for the worm, as indicated in Fig. 9. This bracket is mounted for slight rocking movement on a pin 53 secured in a pair of rearwardly extending ears 53ᵃ on the bracket 45, see Fig. 11. Fixed to or otherwise integral with the worm bracket 52 is a forwardly projecting lever 54 which extends through a vertical slot 54ᵃ in the lower righthand corner of the bracket 45, the lever projecting forwardly beyond the bracket so that it may be manipulated by the operator. Additionally, the worm bracket 52 has a downward extension 52ᵃ. In addition to the worm bracket which is supported on the bearing pin 53 (which is carried by the bracket as aforesaid), there is supported on the pin 53 by two bearing portions 55ᵃ a rocking member 55 which lies beneath the bearing pin and has at one end beneath the lever 54 a projection 55ᵇ and at the other end has an arm 55ᶜ projecting forwardly through a slot 55ᵈ in the lower lefthand portion of the bracket 45 (see particularly Figs. 8, 11 and 29). The projection 55ᵇ has at its lower end a finger 55ᵉ which is adapted to be engaged by a cam hereinafter described, and it also has a hook finger 55ᶠ (see Fig. 9) which is adapted to engage behind the projection 52ᵃ on the lower side of the worm bracket 52. A spring 55ᵍ is between the projection 52ᵃ of the worm bracket and the projection 55ᵇ of the rocking member 55 for a purpose to be explained presently.

It will be apparent from the construction above described that when the hand lever 54 is depressed the worm 50 and shaft 51 are elevated so that the worm will come into engagement with the worm wheel 48, and that when the lever is released the worm 50 and shaft 51 will be lowered by gravity so as to disengage the worm from the worm wheel. As only a short movement is required to engage or disengage the worm and worm wheel, the spring of the shaft 51 can be relied on for this purpose, or, if desired, there may be the equivalent of a universal coupling 51ᶜ provided in the shaft 51 near the gear box 51ᵇ, see Fig. 1.

It is important that the worm 50 be held in engagement with the worm wheel 48 during the entire relatively slow forward or feeding movement of the slide 34, and it is important also that the worm move out of engagement with the worm wheel automatically at the end of the feeding movement. To accomplish these results, certain automatically operated elements are provided. Among these is a pawl 56 which is pivoted at 56ᵃ on the front of the bracket 45, this pawl having near its lower end a shoulder which is adapted to move over the arm 55ᶜ, as shown by full lines in Fig. 8, so as to prevent the arm rising and also to prevent the lever 54 from rising until the disengagement of the worm 50 from the worm wheel 48 is desired, it being understood that at this time the lever 54 is prevented from rising when the arm 55ᶜ is held in its lowered position by the pawl 56 by the spring 55ᵍ which is between the projection 52ᵃ of the worm housing and the projection 55ᵇ which forms a part of the bracket 55 carrying the arm 55ᶜ. At this point it might be mentioned also that when the automatic engagement of the worm with the worm wheel is desired, the projection 55ᵇ is rocked inward, see Fig. 9, by an automatically acting cam, and if at the moment that the worm is elevated the teeth do not properly engage with the teeth of the worm wheel, the spring 55ᵍ will yield or be compressed and a moment later the spring will act to cause full engagement between the teeth of the worm and the teeth of the worm wheel. The pawl 56 is urged inward so that its shoulder will engage over the arm 55ᶜ by a spring-pressed plunger 56ᵇ.

In order that the pawl may be moved in the opposite direction so that its shoulder will be out of the path of movement of the arm 55ᶜ, so as to trip the worm 50 or cause it to be disengaged from the worm wheel 48, the pawl is provided with an adjustable dwell pin 56ᶜ which is in the plane of movement of the control lever 46 and is adapted to be engaged by the enlarged portion 46ᶜ of the control lever 46, as will be explained presently.

Above its enlargement 46ᶜ the control lever has a second enlargement 46ᵈ and on opposite sides of this enlargement there are two automatically acting devices which at different points in the cycle of movement of the slide 34 act on the lever so as to shift or swing it and thus actuate the valve 40, these automatic movements of the control lever and valve occurring only when the worm 50 is disengaged from the worm wheel 48, as will be more fully explained. One of these lever shifting elements is a spring plunger 57 and the other is a plunger actuated pin 58. The plunger 57 is carried by the bracket 45, being slidable in a boss 45ᶜ (see Fig. 3) of the bracket. A spring 57ᵃ seated in the boss 45ᶜ is compressed when the plunger is moved inward or into the boss and throws the plunger outward when the plunger is released. To hold the plunger 57 in its retracted position, there is provided on the front side of the boss 45ᶜ a catch 57ᵇ having a hook portion at its forward end which is adapted to engage over the front end of the plunger to hold the plunger retracted and is normally urged to holding position by a spring 57ᶜ. This catch has a downwardly projecting pin 57ᵈ shown by full lines in Figs. 2, 10 and 28, and by dotted lines in Fig. 3. It is obvious that the spring plunger 57 is arranged so as to swing the control lever 46 to the right as the same is viewed in Figs. 2 and 8.

The pin 58 is arranged to move the lever 46 to the left as the same is viewed in Figs. 2 and 8, this pin being on the opposite side of the lever from the plunger 57. The pin 58 is slidingly supported in a boss 45ᵈ of the bracket 45, this boss being in line with the boss 45ᶜ carrying the spring plunger 57. It is slidingly supported by a boss 38ᶜ projecting from the valve chamber 48. The righthand end of the pin 58 remote from the end which is adapted to engage the lever 46 engages the forward end of a spring plunger 59 slidable in a boss 60ᵃ of a bracket 60 which is bolted to the rear end of the bed. A spring 59ᵃ in the boss tends to throw the plunger 59 outward. This movement which is transmitted through the pin 58 to the control lever 46 moves the control lever to the left as the same is viewed from the front.

On the rear end of the main slide is mounted a catch 61, the forward lower end of which is adapted to engage in front of the spring plunger 59 when the slide is moving rearwardly so as to push the plunger 59 inward and compress the spring 59ᵃ, the catch being normally held with its lower end in the path of the plunger 59 by a spring 61ᵃ, see Fig. 7, with the upper end of the catch against a stop pin 61ᵇ. It has already been stated that in the operation of a lathe of this kind the slide passes through a given number of cycles, the number depending on the number of tool holding faces of the turret, these cycles continuing one after the other, but when the last cycle has been completed, the movement of the slide is automatically stopped for the purpose of unloading and loading the work spindle. In order to initiate a cycle after the end of any one of the series except the last, it is only necessary to rock the catch 61 so as to disengage the lower end of the catch from the plunger 59 to cause the plunger to throw the control lever to the left. This is accomplished by providing at the rear end of the bed, and, in this instance, at the top of the bracket 60, a cam 62 (see particularly Figs. 2, 3 and 6) so positioned that at the end of the return movement of the slide 34 this cam engages the upper end of the catch 61, rocks it on its pivot, and disengages the lower end of the catch from the plunger, allowing it to function for the purpose stated.

When the slide reaches the end of the last cycle of the series, automatic means is provided to prevent the plunger 59 from being moved inwardly by the catch 61 so that the spring 59ᵃ will not be compressed. This is accomplished by providing at the rear end of the slide a lever 63 (see particularly Figs. 6 and 7), which lever is automatically actuated near the end of the last cycle of the series so as to rock the catch from the position shown in Fig. 6 and from the full line position shown in Fig. 7 to the dotted line position shown in Fig. 7. Thus as the slide is nearing the end of the last cycle of the series, the lower end of the catch 61 is lifted just before it comes to the end of the plunger 59, preventing the compression of the spring 59ª and allowing the pin 58 to move the lever from the rapid return position to neutral position, the spring 59ª being stronger than the spring 57ª associated with the spring plunger 57 so that the lever 46 will be moved to its upright or neutral position, compressing somewhat the spring 57ª.

In machines of this kind, the turret is automatically indexed as the turret slide approaches the end of its return movement so as to present a different face of the turret and a different set of tools to the work piece for the next cycle. Various means for indexing the turret are well known and any of the usual indexing devices may be employed. It is also customary to provide in machines of this kind a so-called stop roll which is usually a polygonal drum having as many faces as there are faces on the turret, and each face having adjustably mounted thereon a stop which is adapted to engage a stationary stop on the bed to limit the forward motion of the slide. I employ such a stop roll in my machine, the same being illustrated at 64 in Figs. 3 and 4, this stop roll being connected by gearing indicated by the reference character 65 and shown by dotted lines in Figs. 3 and 4 with the turret so that the indexing movement of the turret will be imparted to the stop roll, moving it one step each time the turret is indexed or moved one step. On the different faces of the stop roll are provided adjustable stops 64ª, each of these stops being adapted on one of the forward movements of the turret slide to engage a stationary stop 65ᵇ on the bed, the stationary stop being shown by full lines in Fig. 4 and by dotted lines in Fig. 3.

The stop roll is splined to a shaft 66 which is rotatably supported by the bed, the rear end of this shaft being connected by gearing 66ª (see Fig. 6) to the shaft of what is usually termed a cam roll 67 which is rotatably supported on the front side of the bed. This cam roll 67, which by reason of the gearing 66ª is indexed along with the stop roll and turret, has mounted on it a series of adjustable cams 67ª each of which functions during one cycle of the turret slide movement to throw the worm 50 into engagement with the worm wheel 48 by the camming action of the cam on the projection 55ᵉ of the bracket 55, the movement thus imparted to the projection being transmitted by the spring 55ᵍ to the worm bracket. This occurs at the time when the relatively slow or feeding movement is to be imparted to the turret slide and the worm is then held in engagement with the worm wheel throughout the feeding movement for the reason that as soon as the engagement between the worm and worm wheel takes place the shoulder of the pawl 56 snaps in over the arm 55ᶜ. The feeding movement of the slide is maintained constant regardless of any tendency for variation in the rate of movement by the worm which is rotated at a constant speed, the action of the worm in accomplishing this result being set forth in the following complete description.

When the machine is idle, the control lever 46 will be in its full line position shown in Fig. 8. When the operator desires to start the turret slide 34 in operation, i. e., initiate the series of cycles through which the slide passes, he will manually move the lever to the left from the full line position designated A in Fig. 8 to the dotted line position indicated by the letter B. This moves the control slide 44 bodily to the left and also moves the valve member 40 to the left, starting the rapid forward movement of the slide 34. When the operator moves the control lever from neutral to rapid traverse forward or from position A to position B, this movement of the lever moves the plunger 57 back, compressing the spring 57ª until the catch 57ᵇ hooks over the front end of the plunger. This rapid forward traverse continues until the tool or tools are about to start the cutting operation, and then one of the cams 67ª comes into operation and causes the engagement of the worm 50 with the worm wheel 48, as already explained. This worm wheel is being rotated by the work spindle at a speed in exact conformity with the desired rate of movement of the slide 34 during feed or during the cutting operation and the first effect of the engagement of the rotating worm with the worm wheel when the latter is in its rapid forward movement is to move the slide 44 to the right, moving the control lever back from position B to position C (Fig. 8) and the valve to a position such as to slow down the movement of the slide to the predetermined rate for feeding. The rotation of the worm now determines the rate of movement of the slide 34 for, if because of a variable leakage factor and any other causes the slide tends to move faster or slower than the predetermined rate, the effect of the uniformly rotating worm on the worm wheel is to slightly move back and forth the control slide 44 and therefore the valve, maintaining the speed of the slide at the constant rate desired. Of course, when the slide is moved at the exact rate, the worm has no driving effect on the worm wheel, the worm wheel being rotated by the action of the stationary rack on the worm wheel, but it does come into effect, as stated above, to shift the worm wheel and valve back and forth (theoretically at least) to maintain the feeding speed constant. Thus it will be seen that I have here provided the equivalent of a differential gear in its controlling action on the movable valve member throughout the feeding movement.

As soon as the forward movement of the slide is stopped by the engagement of one of the stops 64ª of the stop roll with the stationary stop 65ᵇ, the effect of the still rotating worm 50 is to move the worm wheel and slide slightly to the left. When the control lever reaches position B, the valve reaches the end of its movement and comes up against the lefthand plate 38ª (Fig. 2) but the actuation of the control lever to the left continues beyond position B to, say, the position indicated by the letter D in Fig. 8, this continued movement of the slide 44 after the movable valve member has reached the limit of its movement in this direction being permitted by the lost motion connection between the rod 43 and the slide 44, the spring 43ᶜ then being compressed. As the control lever is being moved toward position D, the enlargement 46ᶜ of the lever engages the end of the adjustable dwell pin 56ᶜ carried by the pawl 56 and the pawl is then cammed to the left (Fig. 8). When the lever reaches the position D, the shoulder of the pawl is disengaged from the arm 55ᶜ, as indicated by the dotted line position of the pawl, whereupon the arm 55ᶜ is released and the worm drops out of engagement with the worm wheel. This period between the end of the feeding motion of the slide and the disengagement of the worm from the worm wheel is known as the dwell which is an idle period between the end of the feeding movement of the main slide and the rapid return movement, this dwell being desired with machine tools of this kind in order that the spring may be taken out of the tools when the forward movement of the slide is stopped and before the rapid return movement is initiated. The length of this dwell can be varied as desired by the adjustment of the pin 56ᶜ which is a screw pin and can be set to any desired position. Obviously, if the pin 56ᶜ is moved inwardly, the tripping of the pawl and the disengagement of the worm from the worm wheel will take place sooner than is the case with the pin 56ᶜ in the position shown in Fig. 8, the position D of the control lever when this occurs then being closer to the position B than indicated in Fig. 8.

When the control lever was previously moved from position A to position B for the rapid forward movement of the slide 34, a block 68 (see Fig. 10) carried by the slide 44 was brought up substantially to the end of a camming member 68ª pivoted to the bracket 45. This camming member has a cam face 68ᵇ with a notch or depressed part which is engaged by a pin 68ᶜ engaging the projection 57ᵈ of the catch 57ᵇ, this projection 57ᵈ having been described in connection with the catch 57ᵇ. The movement of the control lever from position A to position B, although the block was brought up substantially to the adjacent end of the camming member, had no effect in so far as changing the position of the camming member 68ª is concerned. Up to this time the hooked end of catch 57ᵇ is in front of the spring plunger 57, but as soon as the control lever is moved beyond position B during the dwell period, the camming member 68ª is moved from the position shown in Fig. 10 to the position shown in Fig. 28, thus actuating the pin 68ᶜ and moving the hooked end of the catch from in front of the spring plunger. At the same time the control lever, in moving from position B to position D, still further moves inward the spring plunger 57. The engagement of the worm 50 with the worm wheel 48 has during this time prevented the spring plunger 57 from throwing the control lever to the right, but as soon as the worm is disengaged from the worm wheel, as explained above, the spring plunger 57 is free to act and immediately throws the control lever from the position D over to position E and this moves the valve to the right to the position which causes the rapid return movement of the slide. During the initial outward movement of the spring plunger 57, the hooked nose of the catch is prevented from again moving in front of the plunger, and after the end of the plunger has moved beyond the point where it might be stopped by the catch, a pin 68ᵈ also carried by the slide 44 comes into action, restoring the cam member 68ª from the position of Fig. 28 to the position of Fig. 10, thus releasing the catch so that it will rest against the side of the plunger, as shown in Fig. 3, and be in position to again engage over the end of the plunger when it is moved back during the next cycle of operations.

When the lever 46 was moved from position D to position E, the plunger pin 58 was moved to the right until a shoulder 58ª thereof came up against a suitable stop, such as the boss 38ᶜ of the valve chamber 38, but at this time the end of the pin is some distance away from the spring plunger 59. When the slide approaches the end of its rapid return movement, the catch 61, which is now in the full line position indicated in Fig. 7, comes up against the end of the plunger 59 and forces the plunger 59 inward, compressing the spring 59ª, and when the upper end of the catch 61 engages the cam 62, the catch is moved out from in front of the plunger which is then shot forward by the spring 59ª, throwing the control lever from rapid reverse to rapid forward movement, i. e., from position E to position B, this movement again compressing the spring 57ª of spring plunger 57 until the catch 57ᵇ comes in front of the end of the plunger. This initiates the second cycle of movement, and the action above described is repeated until the end of the last cycle, when a cam 64ᶜ on the end of the stop roll 64 engages and rocks the lever 63, depressing the upper end of the catch 61 and moving it to the dotted line position shown in Fig. 7 so that when the slide comes back at the end of the last cycle of the series it will not move the plunger 59 inward and compress spring 59ª, so that when the plunger pin 58 comes in contact with the plunger 59, the plunger will act as a solid abutment, causing the control lever to be moved from rapid return position E to neutral position A.

It was previously stated that it is not essential, at least not in all instances, that the shaft 51 which rotates the worm wheel 50 be driven at different speeds relative to the speed of the work spindle, but that in some instances this was desirable and that for that reason the multiple speed gearing 51ª was provided in the drive between the work spindle and the shaft 51. It was also stated that the ratio of the gearing between the shaft 51 and the work spindle could be changed manually if desired. In Fig. 1 I have shown means for changing the speed of the shaft 51 relative to the work spindle automatically, this being accomplished by the shaft 67$^b$ to which the cam roll 67 is secured, the shaft being extended to a point beneath the head 31, and being provided with a cam drum 67$^c$, this cam drum having adjustable cams to actuate a lever 67$^d$ to actuate a gear shifter, such as a sliding key or equivalent device. This makes it possible to provide different rates of feed for the different cycles. This, as before stated, is not essential, but may be desired for the highest efficiency.

With the above structure and in fact with those to be subsequently described, it is possible for the operator to manually disengage the worm 50 from the worm wheel 48 at any time simply by elevating the lever 54. With the worm thus disengaged, the operator can manually move the control lever 46 and thus control manually the movements of the slide. This feature will find its greatest utility in making trial cuts before the tools are permanently set or if the tools are for any purpose to be reset. For example, the operator may initiate the series of cycles, and after the tool in any one cycle has traveled a short distance along the work, the operator may manually disengage the worm from the worm wheel, move the lever to neutral position, measure the work, adjust the tool if necessary, cause the slide to return beyond the point where the cutting operation started, and then again throw the lever to rapid forward position, whereupon the slide will move forwardly with its rapid movement, and when it comes to the point for feeding, the dog on the cam roll will again automatically cause the engagement of the worm with the worm wheel, as before, and the operation will then continue just the same as though it had not been manually interrupted.

In Figs 12, 13 and 14, I have shown a modification which is similar in principle to that first described and in the main is similar to the latter, but differs therefrom in the respect that instead of engaging and disengaging a worm and worm wheel at the beginning and end respectively of the feeding movement, a clutch is provided to render the worm wheel effective or ineffective though it remains constantly in engagement with the worm. With this construction the bed and main slide may be the same or substantially the same as in the first described construction, the bed having, as before, a rack extending along the same, but in this instance the rack here designated 69 has spur teeth instead of worm teeth. The slide has fixed to it a bracket 70 which corresponds to the bracket 45 of the first construction and on the rear of the bracket 70 there is slidably mounted in the same manner as before a control slide 71 corresponding to the slide 44 of the first construction. The rack 69 is at all times engaged by a spur gear 72 pinned or otherwise secured to a shaft 72ª which is supported in the control slide 71 and at its forward end in a strap-like member 71ª which is secured to and forms a part of the control slide 71, the shaft 72ª passing through a slot in the bracket 70 and the strap-like member extending from the ends of the control slide across the front of the bracket 70. On the shaft 72ª and immediately in front of the spur gear 72 is a worm wheel 73 having a sleeve-like extension 73ª extending through the slot in the bracket 70 and provided at its forward end with a clutch member having clutch teeth which are adapted to be engaged by the teeth of a companion clutch member 73$^b$ slidable but keyed on the shaft 72ª, the clutch, composed of the teeth on the two parts 73ª and 73$^b$, being immediately in front of the plate 70 or between the latter and the strap-like member 71ª. The worm wheel 73 is at all times in engagement with a worm 74 keyed but slidable on a shaft 74ª which corresponds to and is actuated precisely like the shaft 51 of the first construction.

As will be seen by reference to Figs. 13 and 14, the strap-like member 71ª forming a part of the control slide has a pair of inwardly projecting ears, and mounted in these ears is a supporting pin 75 on which are mounted two rocking members 75ª and 75$^b$. One of these rocking members 75$^b$ carries a hand lever 75$^c$, a fork 75$^d$ which engages the clutch member 73$^b$, and a downward projection 75$^e$ which is separated by a spring 75$^f$ from the rocking member 75ª, precisely as in the first construction, the latter member having its lower end extended so that it can be engaged by one of the cams 67ª of the cam roll 67 which is mounted and operated like the corresponding cam roll of the first construction. Additionally, the rocking member 75ᵃ has a forwardly projecting arm carrying an adjustable upstanding dwell pin 75ᵍ (see Fig. 12) corresponding to the pin 56ᶜ of the first construction.

The control lever, which is here designated 76, is pivotally mounted at its lower end on the lower forward extension of the bracket 70 like the lever 46 of the first construction, and this lever is automatically shifted by the spring plunger 57 and by the plunger pin 58 which are similar to the corresponding members of the first construction. Additionally, the lever has a laterally projecting arm 76ᵃ which is adapted to engage the upper end of the dwell pin 75ᵍ at some point between the positions indicated at B and D so as to automatically disengage the clutch at the end of the dwell period determined by the adjustment of the pin 75ᵍ after the main slide has been stopped at the end of the feeding movement. It will be noted that when the hand lever 75ᶜ is elevated or in the position indicated in Fig. 13, the clutch is engaged. The hand lever may be moved to this position either by hand or by the action of the cam 67ᵃ of the cam roll on the lower end of the rocking member 75ᵃ. The cam 67ᵃ would have this action on the rocking member 75ᵃ notwithstanding the fact the rocking member is carried by the control slide and therefore has a slight movement on the bracket 70 instead of being carried by the bracket as in the first construction. It will be understood that if the teeth of the movable clutch member do not immediately slide into engagement with the teeth of the companion clutch member, the spring 75ᶠ will be temporarily compressed and will cause this engagement after a very slight rotative movement of the said companion clutch member which is the part connected with the worm wheel 73. Also it will be obvious that when the lever 75ᶜ is in its lowered position the clutch is disengaged, this disengagement being accomplished either manually or automatically by the action of the lever 76 on the dwell pin 75ᵍ, this occurring at the end of the dwell following the end of the forward feeding movement of the slide 34. The rocking member 75ᵃ, which is connected through the spring 75ᶠ to the rocking member 75ᵇ carrying the hand lever 75ᶜ can be held either in the position corresponding to the engaged position of the clutch or in the position corresponding to the disengaged position of the clutch by any suitable means, as, for example, by a spring point here indicated at 77, see Figs. 12 and 14, which in this instance is designed to engage in either of two depressions carried by an upward extension 77ᵃ of the rocking member 75ᵃ. The construction is otherwise exactly the same as with the first described construction and will have all parts or elements which are not illustrated in Figs. 12, 13 and 14 but are illustrated in the complete mechanism.

This mechanism functions like that first described in causing the feed movement to be constant and at a rate dependent upon the rate of rotation of the worm 74 which, as before, will be driven by the work spindle at a predetermined rate with relation to its rotation. The rotating worm acts through the worm wheel and clutch on the control lever 76, the control slide 71 and therefore on the movable valve member, to slightly move the movable valve member back and forth to maintain the constant feed movement irrespective of those factors, such as leakage, which may tend to cause the slide to have an irregular movement, this mechanism therefore providing the same differential action as before, the main difference being, as before explained, that the worm and worm wheel are constantly in engagement and that the worm wheel is clutched to or unclutched from the shaft and therefore from the gear which engages the stationary rack 69 instead of by causing the worm wheel to be engaged and disengaged.

In the form of the invention illustrated in Figs. 15 to 19, the same results previously explained are obtained by the same type of differential mechanism employed in the construction of Figs. 1 to 11, the main difference which I have illustrated in Figs. 15 to 19 being that the valve and control lever are mounted on the bed instead of on the slide as in the first described construction. It will be understood, of course, that the advantage of mounting the valve on the bed rather than on the slide is that it eliminates the necessity for flexible piping between the valve chamber and the pump. With this arrangement of the valve and control lever, precisely the same mechanism may be employed as in Figs. 1 to 11, but with simply a reversal in the arrangement of some of the parts. The bed and main slide 34 are shown as before, but instead of mounting the rack 49 stationarily on the bed, this rack, which is here designated 78, is mounted on the lower front side of the slide 34. The control lever, here designated 79, is pivoted as before to a bracket 80 which is bolted or otherwise stationarily mounted on the bed, this bracket carrying the control slide 81 which is connected precisely as before to a valve rod 82 which in turn is attached to the movable valve member slidably mounted as before in the valve chamber 83 which is bolted or otherwise stationarily mounted on the bed. The only other change of a material nature is the manner in which the cam roll here designated 84 is mounted and operated, this cam roll carrying, as before, the adjustable cams here designated 84ᵃ. In this instance, though the cam roll is rotated step by step in accordance with the step by step movements given to the stop roll and to the shaft 84ᵇ, the cam roll, though it is splined and therefore rotated step by step by the shaft 84ᵇ, moves forwardly and rearwardly with the slide 34, the forward part of the slide having a downward extension 85 with a boss-like member at its lower end through which the forward end of the cam roll extends, with shoulders or collars which permit step by step rotation of the cam roll but constrain the latter to move back and forth with the slide extension 85. One or two other parts are mounted on the slide or on the slide extension 85 instead of being stationarily mounted, and these will be referred to presently.

The rack 78, which is carried by the slide as before stated, engages the worm wheel 48, and this in turn engages the worm 50 carried by the shaft 51 which is mounted and driven as before, the only difference being that the shaft 51 will be rotated in the reverse direction to the shaft of the first construction. These parts, being similar in construction and function to the corresponding parts of the first construction, are given the same reference characters as in that construction. The engagement and disengagement of the worm and worm wheel take place as before through parts described in connection with Figs. 1 to 11. The tripping or automatic disengagement of the worm is accomplished as before, and the automatic movement of the control lever 79 is accomplished by the same means as in the first described construction with simply a reversal in the arrangement of these parts, this arrangement being necessary because the differential action accomplished by the rack 78, worm wheel 48 and worm 50 is the reverse, in so far as the movements imparted to the lever are concerned, over that of the first construction. The control lever, when moved from neutral position A (Fig. 16), is moved to the right or to position B for the rapid forward movement and the feeding position C and the extreme position D which determines the point at which the worm is tripped from the worm wheel, are also to the right of the neutral position. The rapid return position of the lever designated E is to the left of the neutral position. The movements of the control lever are otherwise the same. It will be observed also by a comparison of Fig. 16 with Fig. 8 that the position of the hand lever 54 and of the arm 55ᶜ with its associated pawl 56 carrying the adjustable dwell pin 56ᶜ are in all respects the same as before except that their positions on the bracket are reversed. The control lever is moved from position D to position E by the same spring plunger 57 with its associated catch 57ᵇ with its associated elements 68ᵃ to 68ᶜ, but the spring plunger and its associated parts are at the right side of the lever instead of at the left, as in the first construction. Likewise, the control lever is moved from rapid reverse position E to rapid forward position B by the plunger pin 58 which is now on the lefthand side of the lever instead of on the righthand side, this plunger pin being in this instance integral with the spring plunger 59 which is mounted in the boss 85ᵃ of the extension 85 of the slide. Associated with the plunger 59 is a catch which corresponds in function with the catch 61 of Fig. 7, this catch being here designated 61ᶜ and being in this instance pivotally mounted on the side of the bracket 80 (see Fig. 15ᵃ). It functions precisely like the catch 61 in pushing back the plunger 59 to compress its associated spring at the end of the rapid return movement of the slide. This catch is rocked to release the spring plunger 59 so that it may move the control lever from rapid return position to rapid forward position at the end of each cycle except the last of the series by a cam corresponding to the cam 62 of Fig. 3, the cam being here designated 62ᵃ in Fig. 15 and being in this instance mounted on the extension 85 of the slide. At the end of the last cycle of the series, the catch 61ᶜ is prevented from moving inward, the spring plunger 59 being then acted on by a cam corresponding to the cam 64ᶜ of Fig. 7, this cam being designated 64ᵈ in Fig. 15, and in this instance is carried by the cam roll 84 instead of by the stop roll in Fig. 7, the function being precisely the same whether carried by the stop roll or by the cam roll since they are indexed simultaneously and to the same amount by the 1 to 1 ratio of gearing which connects them.

It is not deemed essential to go into a lengthy description of the operation of the form of the invention shown in Fig. 16, and it will be sufficient to state that to start the series of cycles the operator moves the hand lever from neutral position A to the right to the rapid forward position B, moving inward the spring plunger 57 and allowing the catch 57ᵇ to move in front of the end of the spring plunger as before. This of course shifts the valve to the right, starting the rapid forward movement of the slide. At the end of this part of the slide movement, one of the cams 84ᵃ of the cam roll causes the worm 50 to be moved into engagement with the worm wheel 48 and this immediately causes the control slide to be moved to the left and the control lever to the left, from position B to position C correspondingly moving the valve so as to initiate the feeding movement, this movement being maintained constant at a rate depending upon the rate of rotation of the shaft 51. At the end of the feeding movement, determined by the position of one of the stops on the stop roll, the forward feeding movement of the slide is stopped and since now the movement of the rack 78 is stopped, the action of the worm and worm wheel is to move the control lever (and of course the control slide 81) from position C to position D during which movement the lever engages the dwell pin 56c and finally moves the pawl 56 away from the arm 55c and allow the worm and worm shaft 51 to drop so as to disengage the worm from the worm wheel. As soon as the worm is disengaged from the worm wheel, the spring plunger 57, having been released from the catch 57b as described in connection with the first construction, is thrown forwardly, moving the control lever (also the control slide and valve) from position D over to position E and causing the rapid return movement of the slide. This is discontinued by the action of the cam 62a at the end of each cycle except the last, when the cam 64d so acts on the catch 61c as to cause the control lever to be brought to neutral position instead of to a position to initiate the rapid traverse for the next cycle. It is believed that the construction and operation will be sufficiently understood without further explanation.

It was mentioned above that with the valve mounted on the bed ordinary rigid piping may be employed between the valve and pump as distinguished from flexible piping. It might be stated also that with the valve stationarily mounted on the bed, it is not necessary to employ flexible piping between it and the movable cylinder as the connections may be made through the stationary piston rod and piston in the well known manner.

In the form shown in Figs. 20, 21 and 22, I have shown a differential construction combining the clutch of the form illustrated in Figs. 12 to 14 with the rack fixed to the slide, as in Figs. 15 to 19. So far as the mechanism is concerned, it is similar to that of Figs. 12 to 14, but with the reversal of parts as in Figs. 16 to 19, due to the fact that the rack is movable with the slide rather than being fixed on the bed.

Referring now to Figs. 20 to 22, the bed 30 and the main slide 34 are the same as in all preceding figures. The bracket which carries the differential mechanism is shown at 86, and the control slide which slides on the rear side of the bracket is shown at 86a, the bracket 86 being bolted to the bed as in Figs. 15 to 19. The rack 87 is secured to the slide 34, as in Figs. 15 to 19. This rack has spur teeth and is engaged by a spur gear 87a mounted coaxially with respect to the worm wheel 87b, as in Figs. 12 to 14, except that, in this instance, to conserve space the worm wheel is on the inner side of the gear rather than on the outer side, as in Figs. 12 to 14. The worm wheel engages the worm 87c of the shaft 87d mounted in a bearing of the bracket 86 and supported by this bearing and by the gear box, not here shown, but similar to that shown in Fig. 1, this shaft being driven, of course, as in Fig. 1. The worm wheel 87b is secured to a shaft 87e and the spur gear 87a is on a sleeve which surrounds this shaft, the shaft and sleeve being carried by the control slide 86a and extending through a slot in the bracket 86, the outer end of the shaft having a bearing in the strap 87f which is secured to the ends of the control slide, and extends out through openings 86b of the bracket 86.

The sleeve carrying the spur gear 87a has clutch teeth formed at its outer end and these are adapted to be engaged by the corresponding teeth of a clutch member 88 keyed to but slidable on the shaft 87e. It will be apparent that the worm 87c drives a worm wheel 87b and the shaft 87e with its clutch member 88 at all times, and when the clutch is engaged, these parts will rotate the spur gear 87a. When the clutch is disengaged, the spur gear 87a is not rotated.

Extending in upright position in front of the strap 87f is a control lever 89 which is pivotally mounted as before at its lower end on a suitable part of a bracket 86, this part being in this instance a boss or equivalent extension 86c of the bracket. Above the lower pivoted end of the control lever, the latter has a bore which fits onto the outer end of the shaft 87e so that the differential movements imparted to the control slide 86a will rock the lever back and forth, as previously explained. The strap 87f supports a bearing pin 87g and on this are mounted two rocking members similar to the rocking members of Figs. 12 to 14. One of these rocking members has a hand lever 87h and a fork 87j engaging the movable clutch member 88. It also has a downward projection which cooperates with the downward projection 87k of the other rocking member, a spring being between these projections as before. The second rocking member carrying the projection 87k has a forwardly extending finger 87m carrying an adjustable dwell pin 87n which is adapted to be engaged by a laterally projecting arm 89a of the control lever 89, for the purpose of disengaging the clutch at the end of the dwell period following the feeding movement of the slide. The valve 90 is mounted on the bed precisely as is the valve 83 of the form shown in Figs. 15 to 19, and the movable valve member is connected by the valve rod 90a to the control slide precisely as indicated in Fig. 18.

For the purpose of moving the control lever, the control slide and the movable valve member to change from rapid forward to feed, to stop the feed, to change to rapid reverse at the end of the dwell and then again to rapid forward at the end of each cycle except the last of the series, when the control lever is brought to neutral position, mechanism or parts are employed which are precisely the same as in Figs. 15 to 19, and therefore the functioning of these parts need not be again described. It will be sufficient to state that the spring plunger which moves the control lever to rapid reverse is shown at 91, the associated catch at 91a, the plunger pin which moves the control lever from rapid reverse to rapid forward or brings the control lever to neutral position is shown at 91b, the associated catch being illustrated at 91c, and the cam carried by the downwardly projecting bracket 91d of the slide being shown at 91e. The cam which acts on the catch 91c to cause the slide to come to a stop at the end of the last cycle of the series is not shown, but it will be mounted on the cam roll which will be supported and operated precisely as shown in Fig. 15, this cam roll being indicated at 91f in Fig. 21. Of course this cam roll carries the cams 91g which act on the downward projection 87h of the rocking member to cause engagement of the clutch to start the feed and to control its movement by the differential action of the gear members 87, 87a, 87b and 87c. It will be understood that the operation of this mechanism is precisely the same as before described in regard to the automatic shifting of the control lever and the control slide and the movable valve member connected thereto to cause the slide to have movements at different speeds and in different directions and to cause one cycle to be initiated after another until the end of the last cycle when the slide stops and also to cause the differential action which keeps the feed at a constant rate regardless of the variable leakage factor and other causes which may tend to create or cause an uneven movement of the slide during the cutting operation or feed. It will be understood that some parts not specifically referred to in the description of Figs. 20 to 22, such as the parts which control the catch 91a associated with the spring plunger 91 will be precisely as in Figs. 16 to 19.

In Figs. 23, 24, 25, 26, 27 and 30, I have shown a construction which produces precisely the same results explained above in connection with the other forms of the invention but with a differential mechanism somewhat different from the differential mechanism of the preceding forms. Referring to these figures the bed 30 and the slide 34 are illustrated as before, the valve and the control unit, including the differential mechanism, being in this instance stationarily mounted on the bed, although the same mechanism may be employed wherein the valve and the control unit travel with the slide, as in some of the preceding forms. There is bolted to the bed 30 a two-part housing composed of an inner part 92 and an outer part 92a divided along a vertical plane, as illustrated in Figs. 23, 24 and 25. Extending into this housing is a shaft 93 which corresponds to the shaft 51 of Fig. 1 and to the corresponding shafts of the other previously described forms of the invention, this shaft being designed to be driven from the work spindle in the manner already described through multi-speed gearing, if desired, controlled automatically, as already described, or manually. This shaft is held from endwise movement by two collars 93a (Fig. 25) on opposite sides of a boss 92b of the housing. The shaft is extended a short distance beyond the inner collar 93a and is provided at its inner end with a bevel pinion 93b. This pinion is on a sleeve which has a bearing on the shaft and also a bearing on a portion 92c of the housing (see Fig. 23), this portion of the housing also holding the sleeve against endwise movement and taking the end thrust due to the bevel gears which the pinion engages. One end of the sleeve is formed with clutch teeth which are adapted to be engaged by a clutch member 93c adapted to be shifted to clutch the pinion and its sleeve to the shaft 93 or to disconnect it therefrom. The clutch member 93c is engaged by a clutch fork 93d which is mounted on a clutch shaft 93e which extends vertically through a portion of the housing. At the lower end of this clutch shaft there is an arm in the nature of a bell crank arm 93f, a portion of which carries an adjustable dwell pin 93g, and another portion carries a spring point 93h (see Figs. 23 and 26) which is adapted to engage in either of two depressions formed in an adjacent part of the housing to retain the clutch in either engaged or disengaged position. Another portion of the arm carries a dog 93j which is pivoted to said portion and between them is a spring 93k. This dog 93j is adapted to be engaged by one of the cams 94a of the cam roll 94 which will be mounted and actuated as in Fig. 15, it being understood that the cam roll will move back and forth with the slide and is rotated step by step with the stop roll mounted on the bed 30 and is given a step by step turning movement with each indexing of the turret. The pinion 93b engages a bevel gear 95 having a sleeve which is journaled in the inner part of the housing. Formed on the gear 95 is another bevel gear 95a and opposite this is a similar bevel gear 95b having a sleeve-like portion journaled in the outer part of the housing coaxially with the gear 95 on gear 95a. Engaging both the bevel gears 95a and 95b is a bevel planetary pinion 95c. This bevel pinion is mounted on a pin carried by an enlargement 96a of a control lever 96 (see particularly Fig. 23), this control lever being supported by and rotatably mounted on a shaft 97 which extends through and is journaled in the sleeves of the bevel gears 95 and 95$^b$. Secured to the inner end of the shaft is a spur gear 97$^a$ which at all times meshes with a rack 97$^b$ secured to the slide (see Fig. 24). The bevel gear 95 and the associated bevel gear 95$^a$ are free to turn on the shaft 97 but the bevel gear 95$^b$ is keyed to the shaft, as indicated in Fig. 25.

The control lever 96, which, as before stated, is mounted for rocking movement on the shaft 97 which is about central of the housing 92, 92$^a$, has a downward extension 96$^b$ and the lower end of this extension extends into a slot or opening of a bar or actuator 96$^c$ slidingly mounted in the lower part of the housing. One end of this bar is opposite the dwell pin 93$^g$ (see Figs. 23 and 26), and the other end of the bar is connected through a lost motion connection, including a spring 96$^d$, to the valve rod 96$^e$ connected to the movable valve member of the valve 96$^f$ which is bolted or otherwise stationarily secured to the bed. The lever has an upper part which extends up through a slot in the top of the housing and on opposite sides of the upper part of the lever is a spring plunger 98 and a pin 98$^a$ integral with the spring plunger 98$^b$. The spring plunger 98 is mounted in a boss 98$^c$ forming a part of the housing and has associated with it a pivoted catch 98$^d$ which corresponds to the catch 57$^b$ of the first described construction and similar catches of the later described constructions. This catch is in this instance mounted on the upper squared end of a vertical shaft 98$^e$ which is journaled in bosses of the housing and at its lower end is provided with a pointed finger 98$^f$ which is adjacent the slidable bar 96$^c$. This catch 98$^d$, as before, is adapted to hook over the end of the spring plunger 98 to hold it in retracted position, and it is adapted to be unhooked from the plunger so as to allow it to actuate the control lever 96 by the engagement of the finger 98$^f$ with a sleeve 98$^g$ which is slidably mounted on the sliding bar 96$^c$ between an abutment 98$^h$ and a second abutment 98$^j$ (see Fig. 27). The manner in which this operates will be explained presently. The spring plunger 98$^b$ is mounted in a boss in a downwardly extending portion 34$^a$ of the slide 34, which portion is similar to the part 85 of the slide of Fig. 15. This spring plunger is controlled by a catch 99 pivotally mounted on the end of the housing and corresponding in function to the latch 61$^c$ of Fig. 15. By engaging in front of the end of the spring plunger 98$^b$ when the slide is moving rearwardly, the plunger 98$^b$ is moved inward so as to compress its associated spring and the catch is tripped so as to release the plunger 98$^b$ by a cam 99$^a$ carried by the extension 34$^a$ of the slide and functioning precisely like the cam 62$^a$ of Fig. 15. That is to say, at the end of each cycle of the slide movements except the last cycle of the series, the cam 99$^a$ rocks the catch so as to allow the spring plunger 98$^b$ to move the control lever from rapid return movement to rapid forward movement, but at the end of the last cycle of the series, the catch will be prevented from pressing the plunger 98$^b$ inward by a cam such as the cam 64$^d$ on the cam roll 84 of Fig. 15.

It will be obvious that when the clutch member 93$^c$ is disengaged from the companion clutch member, the pinion 93$^b$ will not be rotated by the power shaft 93, and when the valve is in such position that the slide is moved, the differential gearing will idle freely without having any effect whatsoever on the position of the lever. The clutch may be disengaged by hand, the upper end of the clutch shaft 93$^e$ being provided with a hand lever indicated at 100, and this will make it possible for the operator to move the control lever 96 back and forth so as to actuate the movable valve member and thus manually control the movements of the slide. This is useful, as already stated, in making trial cuts.

When the operator desires to start the machine in operation, with the clutch disengaged, he will move the control lever from neutral position designated A in full lines in Fig. 23 to the rapid forward position B, this being to the right of position A. The slide will then start its rapid forward movement and at the right instant one of the cams 94$^a$ of the cam roll will engage the dog 93$^j$ at the lower end of the clutch shaft and rock the movable clutch member into engagement with the companion clutch member. In the event that the clutch teeth cannot move instantly into engagement, the spring 93$^k$ will be compressed, causing the full engagement an instant later. This now starts the slide in its feeding movement and the differential gearing acts to maintain this at a constant rate for the bevel gear 95 and bevel gear 95$^a$ are now rotated by the bevel pinion 93$^b$ and unless the bevel gear 95$^b$ is rotated at the same speed as the bevel gear 95$^a$ through the action of the spur gear 97$^a$ on the rack 97$^b$, the planetary pinion 97$^c$ will be displaced by the unequal movements of the two differential gears and rock the control lever so as to increase or decrease the slide movement, as may be necessary to maintain it at a constant or uniform rate of movement.

At the end of the feeding movement the slide is stopped by a stop on the stop roll engaging the stationary stop, as described in connection with the preceding forms of the invention, and immediately the action of the rotating pinion 93$^b$ on the differential gearing is to throw the control lever from position C to the right past the rapid forward position for a distance depending upon the adjustment of the dwell pin and when the lever reaches a point near position D the bar 96ᶜ engages the dwell pin and a slight further movement of the control lever causes the bar to throw out the clutch. At or about the time that the bar 96ᶜ engaged the dwell pin, the sleeve 98ᵍ on the bar engaged the finger 98ᶠ and rocked the catch 98ᵉ from in front of the spring plunger 98, and as the control lever is being moved to position D, the spring plunger is pushed inward still further and the catch is held out of engagement by the engagement of the point of the finger 98ᶠ in the groove of the sleeve or slightly beyond the groove, depending upon the length of the dwell. Then as soon as the clutch is disengaged, the spring plunger is free to throw the control lever and to turn the differential gears (which may now turn idly and freely) so as to move the lever from position D over to rapid return position C, and during this movement of the control lever to rapid return position C, the finger 98ᶠ is held by the sleeve 98ᵍ so that the catch cannot come back in front of the spring plunger 98 until the end of the plunger has passed beyond the hook of the catch and when this occurs the abutment 98ʲ engages the sleeve and moves it back with the bar 96ᶜ, allowing the point of the finger to come out of the groove and assume its normal position with the catch again engaging the side of the spring plunger, so that it may again hook in front of the spring plunger 98 for the next cycle of operations.

During the latter part of the rapid return movement of the slide, the end of the spring plunger 98ᵇ engages the latch 99 and the spring plunger is thus moved back and its spring compressed and at the end of the return movement of the slide, the cam 99ᵃ rocks the catch 99 and the spring plunger 98ᵇ is released and throws the control lever from the rapid return position E over to the rapid forward position B, whereupon the next cycle is initiated, but at the end of the last cycle of the series, a cam 64ᵈ on the cam roll rocks the catch 99 so as to prevent its coming in front of the spring plunger 98ᵇ and causing the spring plunger to move the control lever from rapid return position E to neutral position A and stop the slide entirely.

Thus it will be seen that I have provided a hydraulically operated slide with full automatic operation, and with differential mechanism of various forms which insures a constant feeding movement of the slide irrespective of variations in the leakage factor of the hydraulic system, changes in the viscosity of the motive fluid by temperature changes, or other causes such as changes in variations in the load on the cutting tools, and I have shown my invention in its different forms arranged for use on a lathe both where the control unit and valve are movable with the slide, as may be desirable in some instances, and where they are mounted on the bed, as may be desired in other instances, some forms of the invention involving the principle of the drop-out worm from the worm wheel which engages the rack, and others a clutch for rendering the differential mechanism effective or ineffective at different points in the cycle of operations. All forms of the invention are highly efficient and at the same time the mechanism of the control unit of each form of the invention is not only effective for the purpose intended but has the desirable features of simplicity, sensitiveness of control, and durability.

Although the differential mechanism has been illustrated and described herein as having an operative connection with a valve controlling the flow of pressure fluid to the hydraulic motor that actuates the movable member or slide, it should be understood that the present invention also contemplates an arrangement wherein the differential mechanism might be operatively connected to a control device other than a control valve and that the claims of this application are intended to cover not only the control valve but any other control device used in combination with the differential mechanism.

While I have shown several different forms of the invention, it may be embodied in still additional forms which I have not attempted to illustrate, and obviously changes may be made in the details of construction and arrangement in each of the different forms illustrated. I therefore aim in my claims to cover all modifications which do not involve a departure from the spirit and scope of my invention in its broadest aspects.

Having thus described my invention, I claim:

1. In a machine tool, two movable members, hydraulic means for moving one of said members, means for controlling the movement of the hydraulically moved member and a differential mechanism operatively connected to said second named means and having elements connected with both movable members.

2. A machine tool having two movable members, hydraulic means for moving one of said members relative to the other, and means for controlling the movement of said hydraulically moved member comprising a differential mechanism including gear members connected to both of said members.

3. A machine tool having a rotary member and a member which is moved relative thereto, hydraulic means for moving said second member, means for controlling the movement of said second member, and a differential mechanism operatively connected to said last named means and including elements one connected to the first member and the other to said second member.

4. A machine tool having two movable members, one in the form of a slide, hydraulic means for moving said slide relative to the other member, means for controlling the movement of the slide, and a differential mechanism operatively connected to said last named means and having elements connected to said member and to said slide.

5. A machine tool comprising a rotary member, a slide, hydraulic means for moving the slide relative to the rotary member, means for controlling the movements of the slide, and a differential mechanism operatively connected to said second named means and having elements connected both to the slide and to the rotary member.

6. A machine tool having a rotary member and a member which is moved relative thereto, hydraulic means for moving said second member, and means for controlling the movement of said second member comprising a differential mechanism including gear members one connected to the rotary spindle and the other to said second movable member.

7. A machine tool having two movable members one in the form of a slide, hydraulic means for moving the slide relative to the other member, and means for controlling the movement of the slide comprising a differential mechanism having gear members connected to said other member and to said slide.

8. A machine tool comprising a rotary member, a slide, hydraulic means for moving the slide, means comprising a differential mechanism for controlling the movements of the slide and having gear members connected both to the slide and to the rotary member.

9. A machine tool comprising a pair of members, hydraulic means for moving one of said members relative to the other, including a source of fluid supply, a motor, a control valve, and means for actuating the valve to control the movement of said hydraulically moved member comprising a differential mechanism having elements connected to the valve and to both of said members.

10. A machine tool having two members, hydraulic means for moving one relative to the other including a source of fluid supply, a motor, a valve, and a control lever therefor, and means for actuating said valve and control lever comprising a differential mechanism having elements connected to said valve and lever and to both of said members.

11. A machine tool having movable members, hydraulic means for moving one of said members and including a source of fluid supply, a motor, and a valve, means including a differential mechanism for controlling at least a portion of the movement of said last mentioned member, and means for rendering said differential mechanism effective and ineffective.

12. A machine tool comprising movable members, hydraulic means for moving one of said members and including a source of fluid supply, a motor, and a valve, means including a differential mechanism for controlling at least a portion of the movement of said hydraulically moved member, and means for automatically rendering said differential mechanism effective and ineffective.

13. A machine tool having movable members, hydraulic means for moving one of said members and including a source of fluid supply, a control valve and a control lever connected thereto said control lever being manually operable to shift the valve, and means for moving said valve automatically to control the movement of said hydraulically actuated member including a differential mechanism having elements connected to the valve and to said member to shift said lever and said valve.

14. A machine tool having two movable members, hydraulic means for moving one relative to the other including a source of fluid supply, and a valve, and means for controlling said valve comprising a differential mechanism having gear members including a power driven member actuated by said member of the machine tool with respect to which the other member is hydraulically moved.

15. A machine tool having two movable members, hydraulic means for moving one relative to the other including a source of fluid supply, and a valve, and means for controlling said valve comprising a differential mechanism having gear members including a rack and a gear member driven by said member of the tool with respect to which the other member is hydraulically moved.

16. A machine tool having two movable members, hydraulic means for moving one relative to the other including a source of fluid supply, and a valve, means for controlling said valve comprising a differential mechanism having gear members including a rack and a gear member driven by said member of the tool with respect to which the other member is hydraulically moved, and means for rendering said last mentioned gear member effective and ineffective.

17. In a machine tool, a rotary spindle, a slide, hydraulic means for moving the slide toward and from the spindle including a source of fluid supply, a motor, and a valve, and differential mechanism for controlling the valve and having an element connected thereto and having gear elements actuated by the slide and spindle respectively.

18. In a machine tool, a rotary spindle, a slide, hydraulic means for moving the slide toward and from the spindle including a source of fluid supply, a motor, and a valve, and differential mechanism for controlling the valve and having an element connected thereto and having gear elements actuated by the slide and spindle respectively, and means for rendering effective and ineffective said gear element which is actuated by the spindle.

19. A machine tool having a movable member, hydraulic means for moving it including a source of fluid supply, and a valve, a control for the valve including a movable valve actuating member, a device for restraining said actuating member from movement and movable into and out of engagement therewith, and means for temporarily delaying the engaging movement of said device until after the actuating member has functioned.

20. In a machine of the character described, a movable member, hydraulic means for actuating it including a source of fluid supply, a motor, and a control valve, a spring plunger for actuating the valve, a catch for preventing the movement of said plunger and engageable and disengageable with respect to the plunger, and means acting on the catch to temporarily hold it out of engaging position until after the plunger has functioned to shift the valve.

21. In a machine of the character described, a movable member, hydraulic means for moving it including a source of fluid supply, a motor, and a control valve, a movable control element connected with the valve, a shifting device for said control element, a restraining member engageable and disengageable with respect to the shifting device, and means operated by said control element for disengaging said restraining member from the shifting device for temporarily rendering it ineffective to engage the device so that the latter may shift the control element and valve and for later rendering it effective to again restrain the shifting device.

22. In a machine tool, two movable members, means for moving one of said members relative to the other, a device for controlling said means, and a differential mechanism operatively connected to said control device and having elements connected to both movable members.

23. In a machine tool, a rotary member, a slide, means for moving the slide relative to the rotary member, a device for controlling said means, and a differential mechanism operatively connected to said control device and having elements connected to said slide and to said rotary member.

24. In a machine tool, a bed, two movable members thereon, means for moving one of said members relative to the other, a device for controlling said means, and a differential mechanism carried by the bed and operatively connected to said control device and having elements connected with both movable members.

25. In a machine tool, a bed, two movable members thereon, means for moving one of said members relative to the other, a device for controlling said means, and a differential mechanism carried by said relatively moved member and operatively connected to said control device and having one element connected to said bed and another element connected to the other movable member.

26. In a machine tool, two movable members, means for moving one of said members relative to the other, a device for controlling said means, and a differential mechanism including an element operatively connected with one of said members, an element operatively connected with the other of said members, and an element operatively connected with both of said elements and with said control device.

27. In a machine tool, a bed, a rotary member, a slide, hydraulic means for moving said slide, a device for controlling said means, and a differential mechanism carried by said bed and including an element operatively connected with said slide, an element operatively connected with said rotary member, and an element connected with both of said first named elements and with said device.

28. In a machine tool, two movable members, hydraulic means for moving one of said members relative to the other, a device for controlling said means, and a differential mechanism comprising an element operatively connected with said hydraulically moved member, an element operatively connected with the other of said movable members, and a lever pivoted centrally of said elements and having an element connected with both of said first named elements, said lever having an operative connection with said device.

29. In a machine tool, two movable members, hydraulic means for moving one of said members relative to the other, a device for controlling said means, and a differential mechanism comprising an element operatively connected with said hydraulically moved member, an element operatively connected with the other of said members, a lever pivoted centrally of said elements and having an element operatively associated with both of said first named elements, an actuator operatively connected with said lever and said device, and means for connecting and disconnecting one of said first named elements with its respective member, said actuator operating said last named means to disconnect said element and member.

30. In a machine tool, two movable members, hydraulic means for moving one of said members relative to the other, a device for controlling said means, and a differential mechanism comprising an element having two gear faces, one of which is operatively connected with one of said members, a gear operatively connected with the other of said members, and a lever pivoted centrally of said element and said gear and having a gear operatively associated with the other gear face of said element and with said first named gear, said lever being connected to said device.

In testimony whereof, I hereunto affix my signature.

JOHN J. N. VAN HAMERSVELD.